(12) United States Patent
Hutchins et al.

(10) Patent No.: US 8,749,576 B2
(45) Date of Patent: *Jun. 10, 2014

(54) METHOD AND SYSTEM FOR IMPLEMENTING MULTIPLE HIGH PRECISION AND LOW PRECISION INTERPOLATORS FOR A GRAPHICS PIPELINE

(75) Inventors: Edward A. Hutchins, Mountain View, CA (US); Brian K. Angell, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/482,669

(22) Filed: Jul. 6, 2006

(65) Prior Publication Data

US 2006/0268005 A1    Nov. 30, 2006

Related U.S. Application Data

(63) Continuation of application No. 10/845,640, filed on May 14, 2004, now Pat. No. 7,079,156.

(51) Int. Cl.
G09G 5/00 (2006.01)
(52) U.S. Cl.
USPC ........................... 345/606; 345/418; 345/612
(58) Field of Classification Search
None
See application file for complete search history.

(56) References Cited

U.S. PATENT DOCUMENTS

| | | |
|---|---|---|
| 4,208,810 A | 6/1980 | Rohner et al. |
| 4,667,308 A | 5/1987 | Hayes et al. |
| 5,170,152 A | 12/1992 | Taylor |
| 5,268,995 A | 12/1993 | Diefendorff et al. |
| 5,270,687 A | 12/1993 | Killebrew, Jr. |
| 5,285,323 A | 2/1994 | Hetherington et al. |
| 5,313,567 A | 5/1994 | Civanlar et al. |
| 5,384,912 A | 1/1995 | Ogrinc et al. |
| 5,424,755 A | 6/1995 | Lucas et al. |
| 5,461,423 A | 10/1995 | Tsukagoshi |
| 5,487,022 A | 1/1996 | Simpson et al. |
| 5,544,292 A | 8/1996 | Winser |
| 5,557,298 A | 9/1996 | Yang et al. |
| 5,579,473 A | 11/1996 | Schlapp et al. |
| 5,594,854 A | 1/1997 | Baldwin et al. |

(Continued)

FOREIGN PATENT DOCUMENTS

CN          101819676          9/2010

OTHER PUBLICATIONS

Euh, J., Chittamuru, J., Burleson, W., Cordic Vector Interpolator for Power-Aware 3D Computer Graphics, Oct. 2002, IEEE Workshop on Signal Processing Systems, pp. 240-245.*

(Continued)

*Primary Examiner* — Said Broome

(57) ABSTRACT

A rasterizer stage configured to implement multiple interpolators for graphics pipeline. The rasterizer stage includes a plurality of simultaneously operable low precision interpolators for computing a first set of pixel parameters for pixels of a geometric primitive and a plurality of simultaneously operable high precision interpolators for computing a second set of pixel parameters for pixels of the geometric primitive. The rasterizer stage also includes an output mechanism coupled to the interpolators for routing computed pixel parameters into a memory array. Parameters may be programmably assigned to the interpolators and the results thereof may be programmably assigned to portions of a pixel packet.

16 Claims, 21 Drawing Sheets

(56) References Cited

U.S. PATENT DOCUMENTS

| | | | |
|---|---|---|---|
| 5,604,824 A | 2/1997 | Chui et al. | |
| 5,613,050 A | 3/1997 | Hochmuth et al. | |
| 5,710,577 A | 1/1998 | Laumeyer | |
| 5,748,202 A | 5/1998 | Nakatsuka et al. | |
| 5,764,228 A | 6/1998 | Baldwin | |
| 5,777,628 A | 7/1998 | Buck-Gengler | |
| 5,801,711 A | 9/1998 | Koss et al. | |
| 5,808,617 A | 9/1998 | Kenworthy et al. | |
| 5,818,456 A | 10/1998 | Cosman et al. | |
| 5,831,623 A | 11/1998 | Negishi et al. | |
| 5,844,569 A | 12/1998 | Eisler et al. | |
| 5,856,829 A | 1/1999 | Gray, III et al. | |
| 5,943,058 A | 8/1999 | Nagy | |
| 5,963,210 A | 10/1999 | Lewis et al. | |
| 5,977,977 A | 11/1999 | Kajiya et al. | |
| 5,995,121 A | 11/1999 | Alcorn et al. | |
| 6,002,410 A | 12/1999 | Battle | |
| 6,009,435 A | 12/1999 | Taubin et al. | |
| 6,028,608 A | 2/2000 | Jenkins | |
| 6,031,548 A | 2/2000 | Gueziec et al. | |
| 6,052,113 A | 4/2000 | Foster | |
| 6,072,500 A * | 6/2000 | Foran et al. | 345/611 |
| 6,118,452 A | 9/2000 | Gannett | |
| 6,130,673 A | 10/2000 | Pulli et al. | |
| 6,160,557 A | 12/2000 | Narayanaswami | |
| 6,166,743 A | 12/2000 | Tanaka | |
| 6,191,794 B1 | 2/2001 | Priem et al. | |
| 6,198,488 B1 | 3/2001 | Lindholm et al. | |
| 6,208,198 B1 | 3/2001 | Lee | |
| 6,222,550 B1 | 4/2001 | Rosman et al. | |
| 6,229,553 B1 | 5/2001 | Duluk, Jr. et al. | |
| 6,239,808 B1 | 5/2001 | Kirk et al. | |
| 6,239,812 B1 * | 5/2001 | Pettazzi et al. | 345/648 |
| 6,259,461 B1 | 7/2001 | Brown | |
| 6,288,730 B1 | 9/2001 | Duluk, Jr. et al. | |
| 6,304,268 B1 | 10/2001 | Iourcha et al. | |
| 6,313,846 B1 | 11/2001 | Fenney et al. | |
| 6,337,744 B1 | 1/2002 | Kuroda | |
| 6,373,495 B1 | 4/2002 | Lin et al. | |
| 6,400,372 B1 | 6/2002 | Gossweiler, III et al. | |
| 6,421,053 B1 | 7/2002 | Johns et al. | |
| 6,453,330 B1 * | 9/2002 | Battle et al. | 708/290 |
| 6,456,291 B1 | 9/2002 | Fowler | |
| 6,512,524 B1 | 1/2003 | Mang | |
| 6,516,032 B1 | 2/2003 | Heirich et al. | |
| 6,518,974 B2 | 2/2003 | Taylor et al. | |
| 6,525,729 B1 * | 2/2003 | Akerman et al. | 345/426 |
| 6,525,737 B1 | 2/2003 | Duluk, Jr. et al. | |
| 6,542,971 B1 | 4/2003 | Reed | |
| 6,597,363 B1 | 7/2003 | Duluk, Jr. et al. | |
| 6,618,048 B1 | 9/2003 | Leather | |
| 6,618,049 B1 | 9/2003 | Hansen | |
| 6,621,509 B1 | 9/2003 | Eiref et al. | |
| 6,636,214 B1 | 10/2003 | Leather et al. | |
| 6,636,223 B1 | 10/2003 | Morein | |
| 6,664,958 B1 | 12/2003 | Leather et al. | |
| 6,664,960 B2 * | 12/2003 | Goel et al. | 345/423 |
| 6,670,955 B1 | 12/2003 | Morein | |
| 6,693,643 B1 | 2/2004 | Trivedi et al. | |
| 6,711,603 B1 | 3/2004 | Takenaka | |
| 6,717,576 B1 | 4/2004 | Duluk, Jr. et al. | |
| 6,717,577 B1 | 4/2004 | Cheng et al. | |
| 6,731,288 B2 | 5/2004 | Parsons et al. | |
| 6,745,336 B1 | 6/2004 | Martonosi et al. | |
| 6,745,390 B1 | 6/2004 | Reynolds et al. | |
| 6,774,895 B1 | 8/2004 | Papakipos et al. | |
| 6,791,569 B1 | 9/2004 | Millet et al. | |
| 6,807,620 B1 | 10/2004 | Suzuoki et al. | |
| 6,819,331 B2 | 11/2004 | Shih et al. | |
| 6,879,324 B1 | 4/2005 | Hoppe | |
| 6,879,328 B2 | 4/2005 | Deering | |
| 6,891,548 B2 | 5/2005 | Alcorn et al. | |
| 6,912,695 B2 | 6/2005 | Ernst et al. | |
| 6,919,895 B1 | 7/2005 | Solanki et al. | |
| 6,968,296 B2 * | 11/2005 | Royle | 702/190 |
| 6,982,722 B1 | 1/2006 | Alben et al. | |
| 6,987,517 B1 | 1/2006 | Donovan et al. | |
| 6,999,100 B1 * | 2/2006 | Leather et al. | 345/611 |
| 7,034,828 B1 | 4/2006 | Drebin et al. | |
| 7,042,462 B2 | 5/2006 | Kim et al. | |
| 7,079,156 B1 | 7/2006 | Hutchins et al. | |
| 7,098,924 B2 | 8/2006 | Prokopenko et al. | |
| 7,102,639 B2 | 9/2006 | Oka | |
| 7,106,336 B1 | 9/2006 | Hutchins | |
| 7,117,238 B1 | 10/2006 | Foskett et al. | |
| 7,145,566 B2 | 12/2006 | Karlov | |
| 7,190,366 B2 | 3/2007 | Hutchins et al. | |
| 7,224,359 B1 | 5/2007 | Papakipos et al. | |
| 7,257,814 B1 | 8/2007 | Melvin et al. | |
| 7,292,242 B1 | 11/2007 | Wittenbrink et al. | |
| 7,295,204 B2 | 11/2007 | Sfarti | |
| 7,538,773 B1 | 5/2009 | Hutchins | |
| 7,595,806 B1 | 9/2009 | Toksvig et al. | |
| 8,411,105 B1 | 4/2013 | Hutchins | |
| 8,416,242 B1 | 4/2013 | Hutchins | |
| 8,432,394 B1 | 4/2013 | Hutchins | |
| 8,441,497 B1 | 5/2013 | Hutchins et al. | |
| 2002/0089512 A1 | 7/2002 | Slade et al. | |
| 2002/0089701 A1 | 7/2002 | Lu et al. | |
| 2002/0158865 A1 | 10/2002 | Dye et al. | |
| 2002/0163967 A1 | 11/2002 | Youn et al. | |
| 2003/0016217 A1 | 1/2003 | Vlachos et al. | |
| 2003/0063087 A1 | 4/2003 | Doyle et al. | |
| 2003/0201994 A1 | 10/2003 | Taylor et al. | |
| 2004/0012597 A1 | 1/2004 | Zatz et al. | |
| 2004/0012598 A1 | 1/2004 | Zatz | |
| 2004/0012600 A1 | 1/2004 | Deering et al. | |
| 2004/0078504 A1 | 4/2004 | Law et al. | |
| 2004/0119710 A1 | 6/2004 | Piazza et al. | |
| 2004/0125103 A1 | 7/2004 | Kaufman et al. | |
| 2004/0145589 A1 * | 7/2004 | Prokopenko et al. | 345/581 |
| 2004/0227755 A1 | 11/2004 | Sfarti | |
| 2004/0246260 A1 | 12/2004 | Kim et al. | |
| 2004/0257376 A1 | 12/2004 | Liao et al. | |
| 2005/0066205 A1 | 3/2005 | Holmer | |
| 2005/0088450 A1 | 4/2005 | Chalfin et al. | |
| 2005/0124583 A1 | 6/2005 | Becker et al. | |
| 2005/0162436 A1 | 7/2005 | Van Hook et al. | |
| 2005/0195187 A1 | 9/2005 | Seiler et al. | |
| 2005/0231506 A1 | 10/2005 | Simpson et al. | |
| 2005/0231519 A1 | 10/2005 | Solanki et al. | |
| 2005/0237337 A1 | 10/2005 | Leather et al. | |
| 2006/0197768 A1 | 9/2006 | Van Hook et al. | |
| 2009/0096784 A1 | 4/2009 | Wardetzky et al. | |
| 2009/0167763 A1 | 7/2009 | Waechter et al. | |
| 2010/0189342 A1 | 7/2010 | Parr et al. | |

OTHER PUBLICATIONS

Narayanaswami, Efficient Gouraud Shading and Linear Interpolation over Triangles, Computer Graphics Forum, vol. 14, No. 1, pp. 17-24, 1995.

http://www.encyclopedia.com/html/s1/sideband.asp; Nov. 2010, p. 1-4.

Non-Final Office Action Dated Sep. 16, 2005; Applicaton No. 10845640; Patent No. 7079156.

Notice of Allowance Dated Feb. 8, 2006; Application No. 10845640; Patent No. 7079156.

Notice of Allowance Dated Mar. 24, 2006; Application No. 10845640; Patent No. 7079156.

Pixar, Inc.; PhotoRealistic RenderMan 3.9 Shading Language Extensions; Sep. 1999, p. 1-20.

* cited by examiner

1500

```
┌─────────────────────────────────────────────────────────────────┐
│ ACCESS A GEOMETRIC PRIMITIVE COMPRISING A PLURALITY OF VERTICES │
│                         OF A POLYGON                            │
│                             1501                                │
└─────────────────────────────────────────────────────────────────┘
                                 │
                                 ▼
┌─────────────────────────────────────────────────────────────────┐
│     RASTERIZE THE GEOMETRIC PRIMITIVE INTO A PLURALITY OF       │
│                      CORRESPONDING PIXELS                       │
│                             1502                                │
└─────────────────────────────────────────────────────────────────┘
                                 │
                                 ▼
┌─────────────────────────────────────────────────────────────────┐
│     COMPUTE Z PARAMETER VALUES FOR EACH PIXEL OF THE POLYGON,   │
│   WHEREIN EACH Z PARAMETER VALUE COMPRISES AN INTEGER PORTION   │
│                    AND A FRACTIONAL PORTION                     │
│                             1503                                │
└─────────────────────────────────────────────────────────────────┘
                                 │
                                 ▼
┌─────────────────────────────────────────────────────────────────┐
│ CLAMP THE INTEGER PORTION OF THE Z PARAMETER TO A VALID RANGE   │
│ (BIT WIDTH) PLUS A GUARD INDICATOR TO INDICATE THE SLOPE/SIGN OF│
│       THE Z PARAMTER DURING A ROLLOVER/OVERFLOW                 │
│                             1504                                │
└─────────────────────────────────────────────────────────────────┘
                                 │
                                 ▼
┌─────────────────────────────────────────────────────────────────┐
│  PERFORM PER PIXEL CLIPPING USING THE GUARD INDICATOR OF THE Z  │
│                           PARAMETER                             │
│                             1505                                │
└─────────────────────────────────────────────────────────────────┘
```

```
┌─────────────────────────────────────────────────────────────────┐
│  ACCESS A GEOMETRIC PRIMITIVE COMPRISING A PLURALITY OF VERTICES │
│                         OF A POLYGON                             │
│                             2101                                 │
└─────────────────────────────────────────────────────────────────┘
                                │
                                ▼
┌─────────────────────────────────────────────────────────────────┐
│      RASTERIZE THE GEOMETRIC PRIMITIVE INTO A PLURALITY OF       │
│                     CORRESPONDING PIXELS                         │
│                             2102                                 │
└─────────────────────────────────────────────────────────────────┘
                                │
                                ▼
┌─────────────────────────────────────────────────────────────────┐
│   COMPUTE LOD PARAMETER VALUES FOR EACH PIXEL OF THE GEOMETRIC   │
│   PRIMITIVE, WHEREIN EACH LOD PARAMETER VALUE COMPRISES AN       │
│          INTEGER PORTION AND A FRACTIONAL PORTION                │
│                             2103                                 │
└─────────────────────────────────────────────────────────────────┘
                                │
                                ▼
┌─────────────────────────────────────────────────────────────────┐
│   CLAMP THE INTEGER PORTION AND THE FRACTIONAL PORTION OF THE    │
│             LOD PARAMETER TO A VALID RANGE                       │
│                             2104                                 │
└─────────────────────────────────────────────────────────────────┘
                                │
                                ▼
┌─────────────────────────────────────────────────────────────────┐
│  PROPAGATE THE CLAMPED LOD PARAMETER TO THE DATA FETCH STAGE     │
│                       OF THE PIPELINE                            │
│                             2105                                 │
└─────────────────────────────────────────────────────────────────┘
```

FIGURE 21

METHOD AND SYSTEM FOR IMPLEMENTING MULTIPLE HIGH PRECISION AND LOW PRECISION INTERPOLATORS FOR A GRAPHICS PIPELINE

This Application is a continuation of commonly assigned, U.S. patent application A METHOD AND SYSTEM FOR IMPLEMENTING MULTIPLE HIGH PRECISION AND LOW PRECISION INTERPOLATORS FOR A GRAPHICS PIPELINE, by Hutchins et al., Ser. No. 10/845,640, filed on May 14, 2004, now U.S. Pat. No. 7,079,156, which is incorporated herein in its entirety.

CROSS REFERENCE TO RELATED APPLICATIONS

This application is related to, and incorporates by reference, the following commonly assigned U.S. patent applications:

A METHOD AND SYSTEM FOR IMPLEMENTING CLAMPED Z VALUE INTERPOLATION IN A RASTER STAGE OF A GRAPHICS PIPELINE, by Ed Hutchins, filed on May 14, 2004, Ser. No. 10/845,992;

A METHOD AND SYSTEM FOR IMPLEMENTING PARAMETER CLAMPING TO A VALID RANGE IN A RASTER STAGE OF A GRAPHICS PIPELINE, by Ed Hutchins, filed on May 14, 2004, Ser. No. 10/845,987;

METHOD AND SYSTEM FOR COMPUTING PIXEL PARAMETERS, by Ed Hutchins, filed on May 14, 2004, Ser. No. 10/846,771; and METHOD AND SYSTEM FOR A GENERAL INSTRUCTION RASTER STAGE THAT GENERATES PROGRAMMABLE PIXEL PACKETS, by Ed Hutchins et al., filed on May 14, 2004, Ser. No. 10/845,642.

FIELD OF THE INVENTION

The present invention is generally related to computer implemented graphics. More particularly, embodiments of the present invention are directed towards low power programmable processors for graphics applications.

BACKGROUND OF THE INVENTION

The rendering of three-dimensional (3D) graphical images is of interest in a variety of electronic games and other applications. Rendering is the general term that describes the overall multi-step process of transitioning from a database representation of a 3D object to a two-dimensional projection of the object onto a viewing surface.

The rendering process involves a number of steps, such as, for example, setting up a polygon model that contains the information which is subsequently required by shading/texturing processes, applying linear transformations to the polygon mesh model, culling back facing polygons, clipping the polygons against a view volume, scan converting/rasterizing the polygons to a pixel coordinate set, and shading/lighting the individual pixels using interpolated or incremental shading techniques.

Graphics Processing Units (GPUs) are specialized integrated circuit devices that are commonly used in graphics systems to accelerate the performance of a 3D rendering application. GPUs are commonly used in conjunction with a central processing unit (CPU) to generate 3D images for one or more applications executing on a computer system. Modern GPUs typically utilize a graphics pipeline for processing data.

Prior art FIG. 1 shows a diagram depicting the various stages of a traditional prior art pipeline 100. The pipeline 100 is a conventional "deep" pipeline having stages dedicated to performing specific functions. A transform stage 105 performs geometrical calculations of primitives and may also perform a clipping operation. A setup/raster stage 110 rasterizes the primitives. A texture address 115 and texture fetch 120 stage are utilized for texture mapping. A fog stage 130 implements a fog algorithm. An alpha test stage 135 performs an alpha test. A depth test 140 performs a depth test for culling occluded pixels. An alpha blend stage 145 performs an alpha blend color combination algorithm. A memory write stage 150 writes the output of the pipeline.

The stages of the traditional GPU pipeline architecture illustrated in FIG. 1 are typically optimized for high-speed rendering operations (e.g., texturing, lighting, shading, etc.) using a widely implemented graphics programming API (application programming interface), such as, for example, the OpenGL™ graphics language, Direct3D™, and the like. The architecture of the pipeline 100 is configured as a multi-stage deep pipeline architecture in order to maximize the overall rendering throughput of the pipeline. Generally, deep pipeline architectures have sufficient data throughput (e.g., pixel fill rate, etc.) to implement fast, high quality rendering of even complex scenes.

There is an increasing interest in utilizing 3D graphics in portable handheld devices where cost and power consumption are important design requirements. Such devices include, for example, wireless phones, personal digital assistants (PDAs), and the like. However, the traditional deep pipeline architecture requires a significant chip area, resulting in greater cost than desired. Additionally, a deep pipeline consumes significant power, even if the stages are performing comparatively little processing. This is because many of the stages consume about the same amount of power regardless of whether they are processing pixels.

As a result of cost and power considerations, the conventional deep pipeline architecture illustrated in FIG. 1 is unsuitable for many graphics applications, such as implementing 3D games on wireless phones and PDAs. For example, such conventional deep pipelines are configured to compute the various parameters required to render the pixels of an object using multiple standardized, high precision functions. Typical per-pixel parameters include, for example, texture coordinates, colors, depth values, level of detail parameters, and the like. The functions are implemented such that they generate high precision results even in those circumstances where such precision is redundant or unnecessary.

The costs of such precision can be an expansion in the amount of data that must be pushed down the pipeline architecture, an increased number of transistors necessary to compute all parameter cases with the specified precision, an increased amount of circuit switching activity, and the like. Each of these costs run counter to the objective of implementing efficient high performance 3D rendering on a portable handheld device. Therefore, what is desired is a processor architecture suitable for graphics processing applications but with reduced power and size requirements.

SUMMARY OF THE INVENTION

Embodiments of the present invention provide a method and system for implementing multiple high precision and low precision interpolators in a raster stage of a graphics pipeline.

Embodiments of the present invention direct parameter computations requiring high precision to execute on high precision interpolators. Those pixel parameter computations that do not significantly benefit from high precision are directed to execute on low precision interpolators. Both the high precision and low precision interpolator computations execute in parallel. In this manner, embodiments of the present invention provide a graphics processor architecture with reduced power and size requirements.

In one embodiment, the present invention is implemented as a raster stage having a plurality of simultaneously operable low precision interpolators for computing a first set of pixel parameters (e.g., low precision parameters) for pixels of a geometric primitive and a plurality of simultaneously operable high precision interpolators for computing a second set of pixel parameters (e.g., high precision parameters) for pixels of the geometric primitive. The rasterizer stage also includes an output mechanism coupled to the interpolators for routing computed pixel parameters into a memory array (e.g., one or more pixel packet rows). The low precision interpolators require significantly less silicon area and consume significantly less power than the high precision interpolators.

In one embodiment, the plurality of interpolators of the raster stage are configured to use Barycentric coordinates to interpolate parameters for each pixel of a polygon. By using Barycentric coordinates, the interpolators can be implemented as fixed point interpolators (e.g., as opposed to floating point), thereby reducing their gate count and power consumption. Additionally, the interpolators can programmably store their results into multiple positions of a pixel packet row.

BRIEF DESCRIPTION OF THE DRAWINGS

The present invention is illustrated by way of example, and not by way of limitation, in the figures of the accompanying drawings and in which like reference numerals refer to similar elements.

Prior art

FIG. 15 shows a flowchart of the steps of a clamped z value interpolation process in accordance with one embodiment of the present invention.

FIG. 21 shows a flowchart of the steps of an LOD parameter clamping process 1000 in accordance with one embodiment of the present invention.

DETAILED DESCRIPTION OF THE INVENTION

Figure 1:
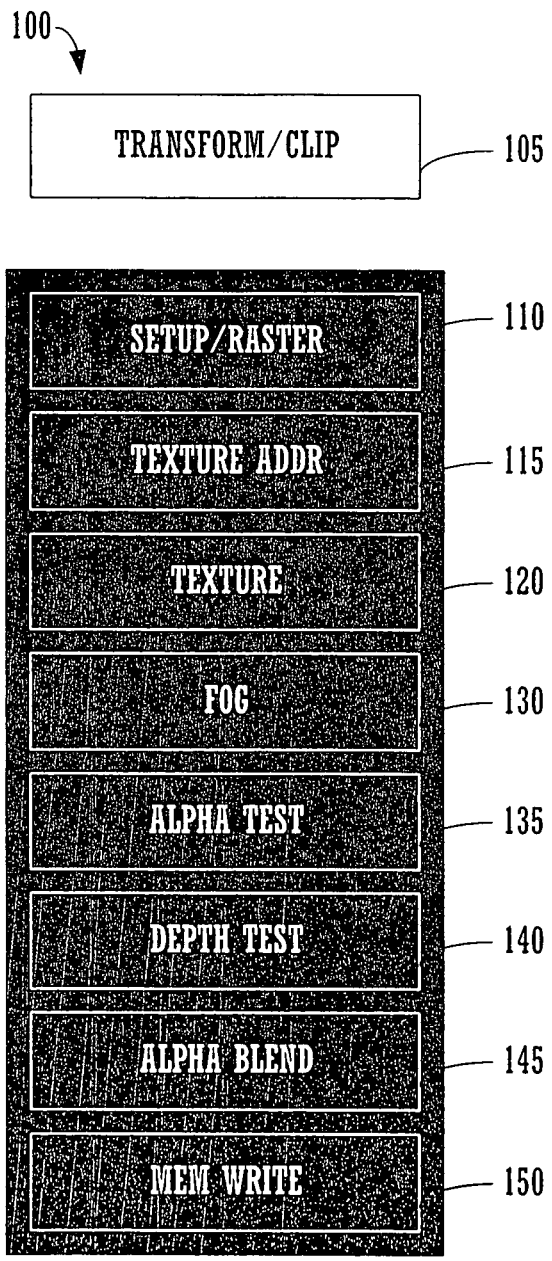
FIG. 1 shows a diagram depicting the various stages of a traditional prior art pipeline.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 200 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
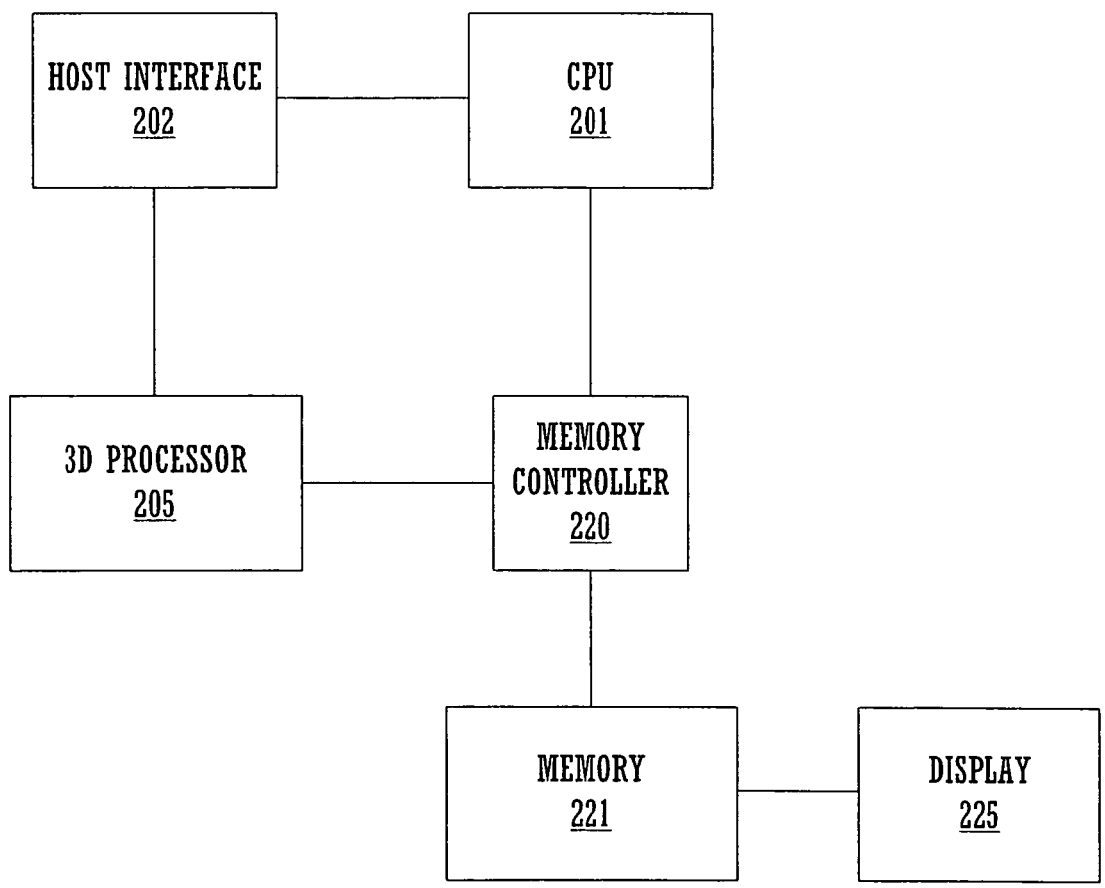
FIG. 2 shows a computer system in accordance with one embodiment of the present invention.

Computer System Platform:

With reference now to FIG. 2, a computer system 200 in accordance with one embodiment of the present invention is shown. Computer system 200 in accordance with one embodiment of the present invention provides the execution platform for implementing certain software-based functionality of the present invention. As depicted in FIG. 2, the computer system 200 includes a CPU 201 coupled to a graphics processor 205 via a host interface 202. The host interface 202 translates data and commands passing between the CPU 201 and the graphics processor 205 into their respective formats. Both the CPU 201 and the graphics processor 205 are coupled to a memory 221 via a memory controller 220. In the system 200 embodiment, the memory 221 is a shared memory, which refers to the property whereby the memory 221 stores instructions and data for both the CPU 201 and the graphics processor 205. Access to the shared memory 221 is through the memory controller 220. The shared memory 221 also stores data comprising a video frame buffer which drives a coupled display 225.

As described above, certain processes and steps of the present invention are realized, in one embodiment, as a series of instructions (e.g., software program) that reside within computer readable memory (e.g., memory 221) of a computer system (e.g., system 200) and are executed by the CPU 201 and graphics processor 205 of system 200. When executed, the instructions cause the computer system 200 to implement the functionality of the present invention as described below.

As shown in FIG. 2, system 200 shows the basic components of a computer system platform that implements the functionality of the present invention. Accordingly, system 200 can be implemented as, for example, a number of different types of portable handheld electronic devices. Such devices can include, for example, portable phones, PDAs, handheld gaming devices, and the like. In such embodiments, components would be included that are designed to add peripheral buses, specialized communications components, support for specialized IO devices, and the like.

Additionally, it should be appreciated that although the components 201-225 are depicted in FIG. 2 as a discrete components, several of the components 201-225 can be implemented as a single monolithic integrated circuit device (e.g., a single integrated circuit die) configured to take advantage of the high levels of integration provided by modern semiconductor fabrication processes. For example, in one embodiment, the CPU 201, host interface 202, graphics processor 205, and memory controller 220 are fabricated as a single integrated circuit die.

Figure 3:
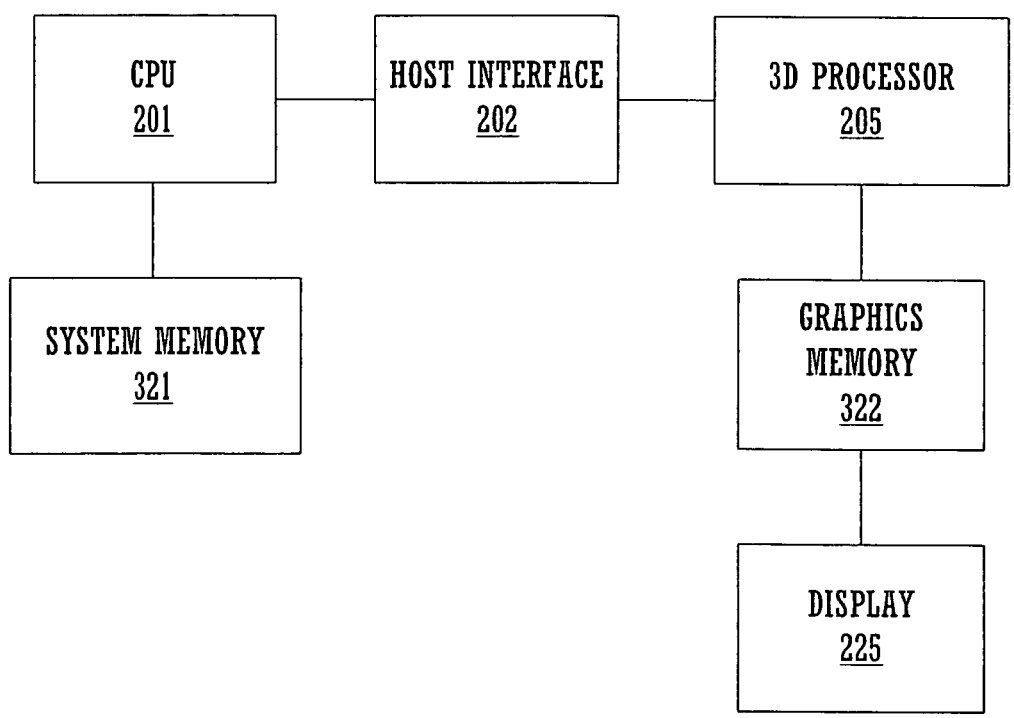
FIG. 3 shows a computer system in accordance with a second embodiment of the present invention.

FIG. 3 shows a computer system 300 in accordance with one alternative embodiment of the present invention. Computer system 300 is substantially similar to computer system 200 of FIG. 2. Computer system 300, however, utilizes the processor 201 having a dedicated system memory 321, and the graphics processor 205 having a dedicated graphics memory 322. In the system 300 embodiment, the system memory 321 stores instructions and data for processes/threads executing on the CPU 201 and the graphics memory 322 stores instructions and data for those processes/threads executing on the graphics processor 205. The graphics memory 322 stores data the video frame buffer which drives the display 225. As with computer system 200 of FIG. 2, one or more of the components 201-322 of computer system 300 can be integrated onto a single integrated circuit die.

Figure 4:
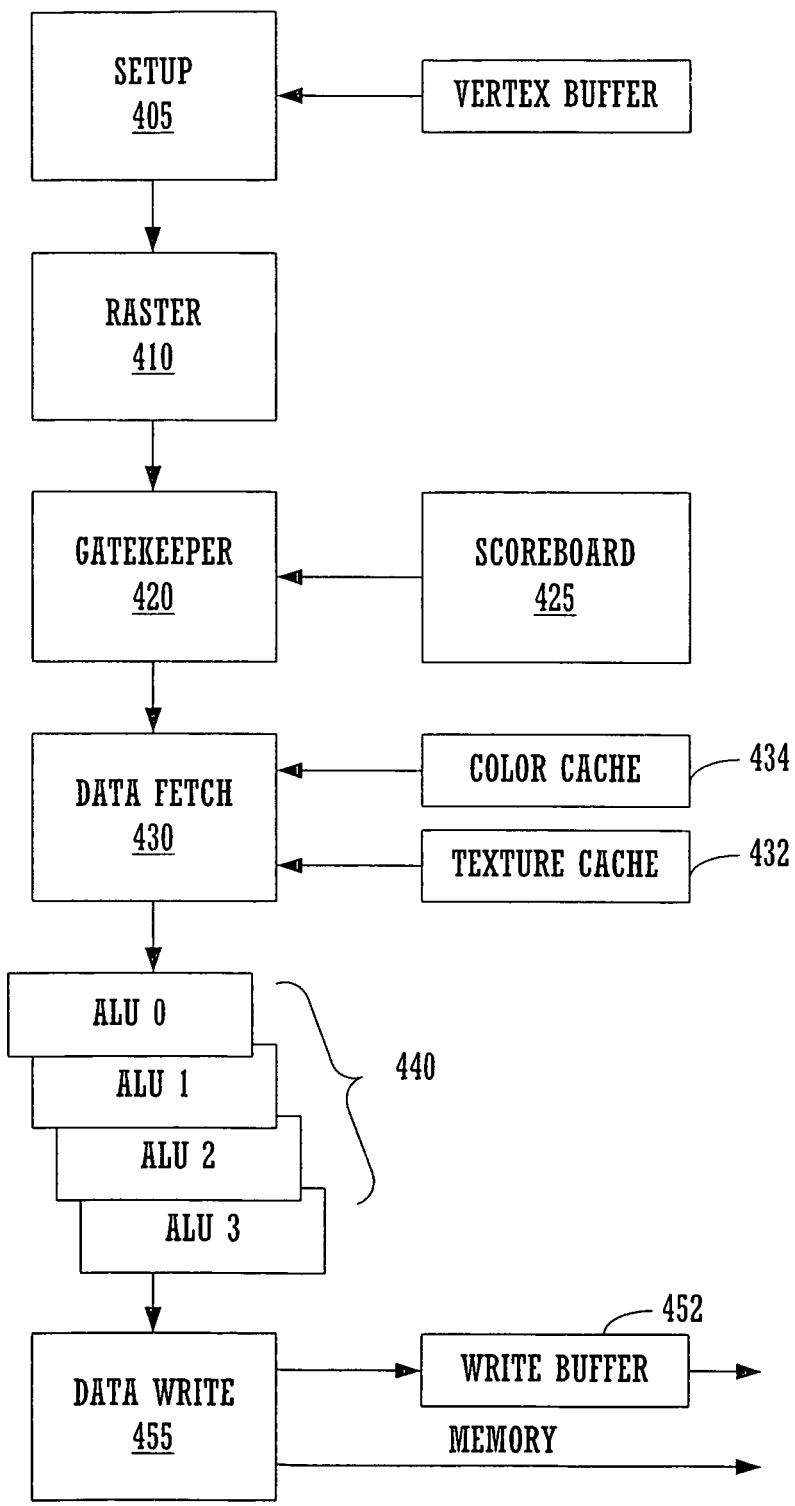
FIG. 4 is a block diagram illustrating the components comprising a programmable graphics processor in accordance with one embodiment of the present invention.

FIG. 4 is a block diagram illustrating the components comprising an exemplary programmable graphics processor 205 in accordance with one embodiment of the present invention. As depicted in FIG. 4, the graphics processor 205 includes a setup stage 405, a raster stage 410, a gatekeeper stage 420, a data fetch stage 430, Arithmetic Logic Unit (ALU) pipeline 440, and a data write stage 455. In one embodiment, programmable graphics processor 205 includes ALUs 450 configured to execute a shader program to implement 3D graphics operations such as a texture combine, fog, alpha blend, alpha test, or other shading algorithms. However, it will be understood throughout the following discussion that programmable graphics processor 205 may also be configured to perform other types of processing operations.

A setup stage 405 receives instructions and graphics primitives from a host, such as a software application running on the CPU 201. In one embodiment, setup stage 405 performs the functions of geometrical transformation of coordinates (X-form), clipping, and setup. The setup unit takes vertex information (e.g., x, y, z, color and/or texture attributes, etc.) from primitives and applies a user defined view transform to calculate screen space coordinates for each geometric primitive (often referred to as triangles because primitives are typically implemented as triangles), which is then sent to the raster stage 410 to draw the given triangle. A vertex buffer 408 may be included to provide a buffer for vertex data used by setup stage 405. In one embodiment, setup stage 405 sets up barycentric coordinate transforms. In one implementation, setup stage 405 is a floating point Very Large Instruction Word (VLIW) machine that supports 32-bit IEEE fl, S15.16 fixed point and packed 0.8 formats.

Raster stage 410 receives data from setup stage 405 regarding triangles that are to be rendered (e.g., converted into pixels). Raster stage 410 processes parameters for each pixel of a given triangle by interpolation and determines shader attributes that need to be interpolated for a pixel as part of rendering, such as calculating color, texture, and fog blend factors. In one embodiment, raster stage 410 calculates barycentric coordinates for pixel packets. In a barycentric coordinate system, distances in a triangle are measured with respect to its vertices. The use of barycentric coordinates reduces the required dynamic range, which permits using fixed point calculations that require less power than floating point calculations.

Raster stage 410 generates at least one pixel packet for each pixel of a triangle that is to be processed. Each pixel packet includes fields for a payload of pixel attributes required for processing (e.g., color, texture, depth, fog, (x,y) location) along with sideband information, and an instruction sequence of operations to be performed on the pixel packet. An instruction area in raster stage 410 (not shown) assigns instruction sequence numbers to pixel packets. The sideband information may also include a valid field, and a kill field. The pixel packet may include one or more rows of pixel information.

Gatekeeper stage 420 performs a data flow control function to the downstream units. In one embodiment, gatekeeper stage 420 has an associated scoreboard 425 for scheduling, load balancing, resource allocation, and hazard avoidance of pixel packets. Scoreboard 425 tracks the entry and retirement of pixels. Pixel packets entering gatekeeper stage 420 set the scoreboard and the scoreboard is reset as the pixel packets drain (e.g., retire) out of graphics processor 205 after completion of processing, or marked as killed.

Data fetch stage 430 fetches data for pixel packets passed on by gatekeeper 420. This may include, for example, fetching color, depth, and texture data by performing appropriate color, depth, or texture data reads for each row of pixel packets. The data fetch stage 430 may, for example, fetch pixel data from a frame buffer (not shown), fetch texel data from a texture map, and may also manage a local texture/fog cache 432 and a color/depth cache 434. Data that is fetched is placed onto a pixel packet field prior to sending the pixel packet on to the next stage.

The row of pixel packets enter an arithmetic logic unit (ALU) pipeline 440 for processing. ALU pipeline 440 has a sequence of ALUs. While four ALUs are illustrated, more or less ALUs may be used in ALU pipeline 440 depending upon the application.

The output of ALU pipeline 440 goes to data write stage 455. The data write stage 455 converts pixel packets into pixel data and stores the result (e.g., color, z depths, etc.) in a write buffer 452 or directly to a frame buffer in memory. Examples of functions that data write stage 455 may perform include color and depth write back, and format conversion.

Figure 5:
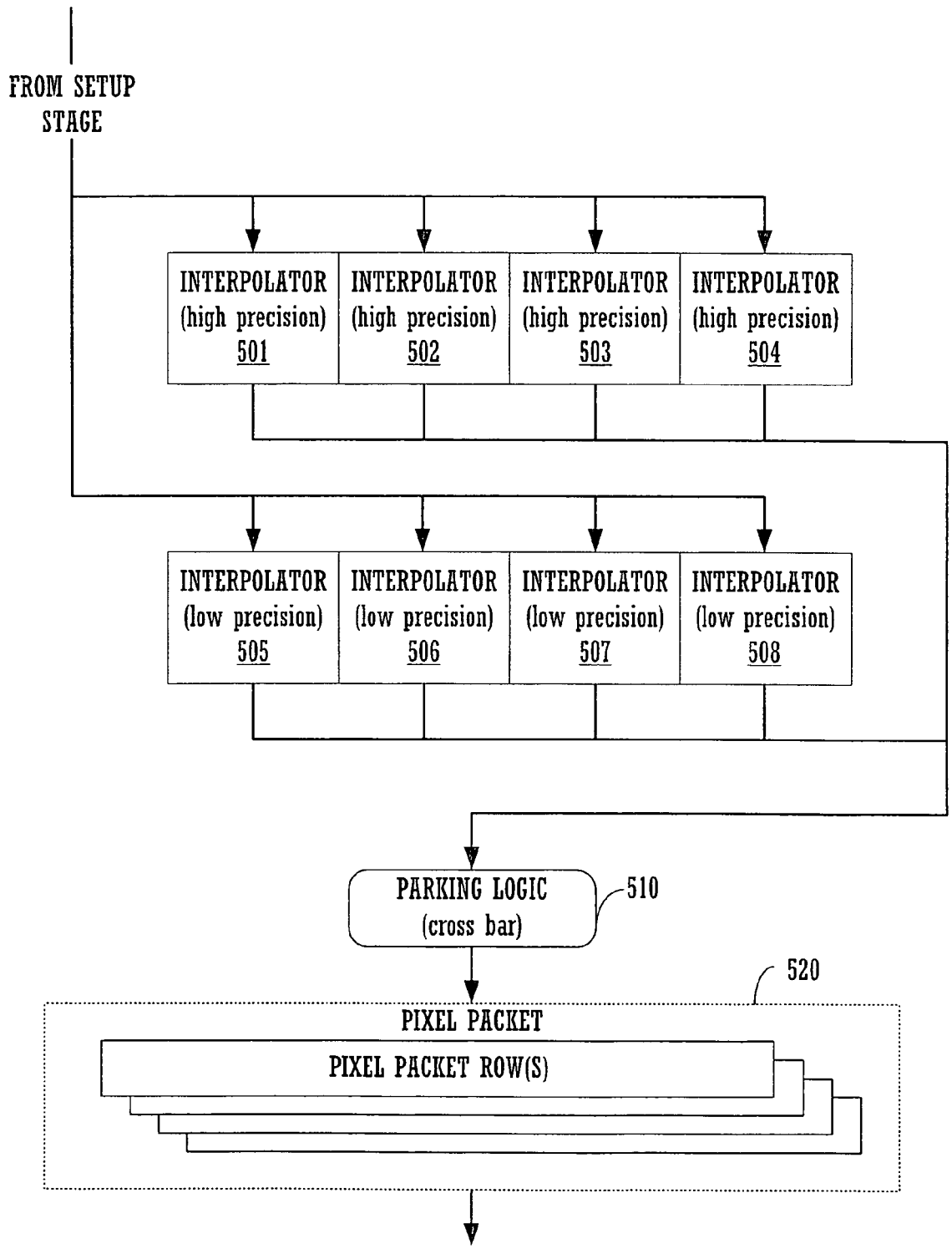
FIG. 5 shows an exemplary diagram of a plurality of high precision and low precision interpolators as implemented within a raster stage in accordance with one embodiment of the present invention.

FIG. 5 shows a diagram of a plurality of simultaneously operable interpolators 501-508 as implemented within the raster stage 410 in accordance with one embodiment of the present invention. As depicted in FIG. 5, a set of high precision interpolators (e.g., four interpolators 501-504) and a set of low precision interpolators (e.g., four low precision interpolators 505-508) are shown.

As described above, the raster stage 410 receives data from setup stage 405 regarding triangles that are to be rendered (e.g., converted into pixels). For each received triangle, the raster stage 410 rasterizes the triangle into each of its constituent pixels with a number parameters interpolated for each pixel. The rasterizer computes rendering parameters for each of the pixels of the triangle by systematically evaluating each of the pixels in a deterministic, sequential manner (e.g., "walking" the triangle). The parameters are computed through an interpolation process from the data associated with the triangle's vertices.

The raster stage 410 advantageously utilizes an array of programmable interpolators 501-508 to compute the parameters in parallel. As the raster stage 410 walks each pixel, the parameters for that pixel are iterated, and the resulting data is passed down to subsequent stages of the pipeline (e.g., as a pixel packet). The interpolated results can be placed in programmably selectable positions in the pixel packet. As is generally known, complex 3D scenes can typically have a large number of polygons, and additionally, a large number of rendering parameters for each polygon. Such parameters include, for example, color, texture coordinates, transparency, depth, level of detail (LOD), and the like. A real-time 3D rendering pipeline needs to perform many millions of calculations per second to maintain the pixel throughput (e.g., fill rate) required to draw a realistic 60-70 frames per second. The raster stage 410 utilizes the parallel array of interpolators 501-508 to maintain the required pixel fill rate while conserving power consumption and silicon area.

The outputs of the interpolators 501-508 are used to construct a plurality of pixel packet rows (e.g., a data structure in a memory array). In the present embodiment, a programmable packing logic module 510 (e.g., including a crossbar switch) functions by arranging the outputs of the interpolators 501-508 into a pixel packet row and formatting the fields of the row for the pixel parameters required for subsequent processing (e.g., color, texture, depth, fog, etc.). The placement of the outputs (e.g., of the interpolators 501-508) into the rows is programmable. In addition to these parameters, the packing logic module 510 arranges processing instructions (e.g., for the subsequent operations to be performed on the pixel packet) into the pixel packet row. For example, as a pixel is iterated, the computed parameters produced by the interpolators 501-508 enable subsequent stages of the graphics pipeline to fetch the required surface attributes (e.g., color, texture, etc.) needed to complete the pixel's rendering. For a simple 3D scene, a given pixel can be described using a single row (e.g., a one row pixel packet). In comparison, for a more complex 3D scene, a given pixel description may require a plurality of rows (e.g., a four row pixel packet).

In the present embodiment, the interpolators 501-508 are programmable and can be flexibly assigned interpolation computations. In other words, the parameter assignment to the interpolators is programmable. The assigned interpolation computations can be software scheduled such that each of the eight interpolators is kept busy as much as possible (e.g., on a per clock basis). In one embodiment, a software scheduler ensures the interpolators 501-508 are kept busy and that latency/idle time is avoided. In this manner, a given pixel parameter computation can be flexibly assigned to any one of the interpolators 501-508. Once made for a triangle, the parameter assignment to the interpolators is fixed for each of the pixels of that triangle. The parameter assignment can be reprogrammed, or otherwise reconfigured, for the next triangle. In this manner, the parameter assignment to the interpolators is programmable on a per triangle basis.

In the present embodiment, the array of interpolators 501-508 are divided into high precision interpolators (e.g., interpolators 501-504) and low precision interpolators (e.g., interpolators 505-508). The division is configured to maintain the flexible assignability of interpolation computations, while simultaneously conserving silicon area dedicated to the interpolator array. The division is configured to take advantage of the fact that some parameters need to be computed in high precision (e.g., texture coordinates) while other parameters do not. For such low precision parameters, the extra precision afforded by a high precision computation provides no significant contribution to the resulting image. Accordingly, low precision parameters can be assigned to the low precision interpolators 505-508. The low precision interpolators 505-508 require significantly less silicon area for their implementation. Additionally, the low precision interpolators 505-508 consume less power per clock cycle. These are important design considerations for a handheld device.

In one embodiment, the interpolators 501-508 use barycentric coordinates for their parameter computations. As described above, the use of barycentric coordinates permits the use of fixed point calculations that require less power than floating point calculations. In one embodiment, the high precision interpolators 501-504 produce a plurality of 14-bit interpolant coefficients and the low precision interpolators 505-508 produce a plurality of 8-bit interpolant coefficients, although any resolution range can be implemented. Generally, the precision selected for the interpolant coefficients is dictated by the maximum allowed error tolerable for the resulting high and low precision interpolated values.

Additionally, in one embodiment, the interpolators 501-508 use perspective corrected barycentric coordinates for their parameter computations. This allows interpolation perspective corrected parameters by the interpolators 501-508. In one embodiment, the perspective correction process uses a perspective correction pixel parameter "w" that is computed in floating point precision once for each pixel of a triangle.

Figure 6:
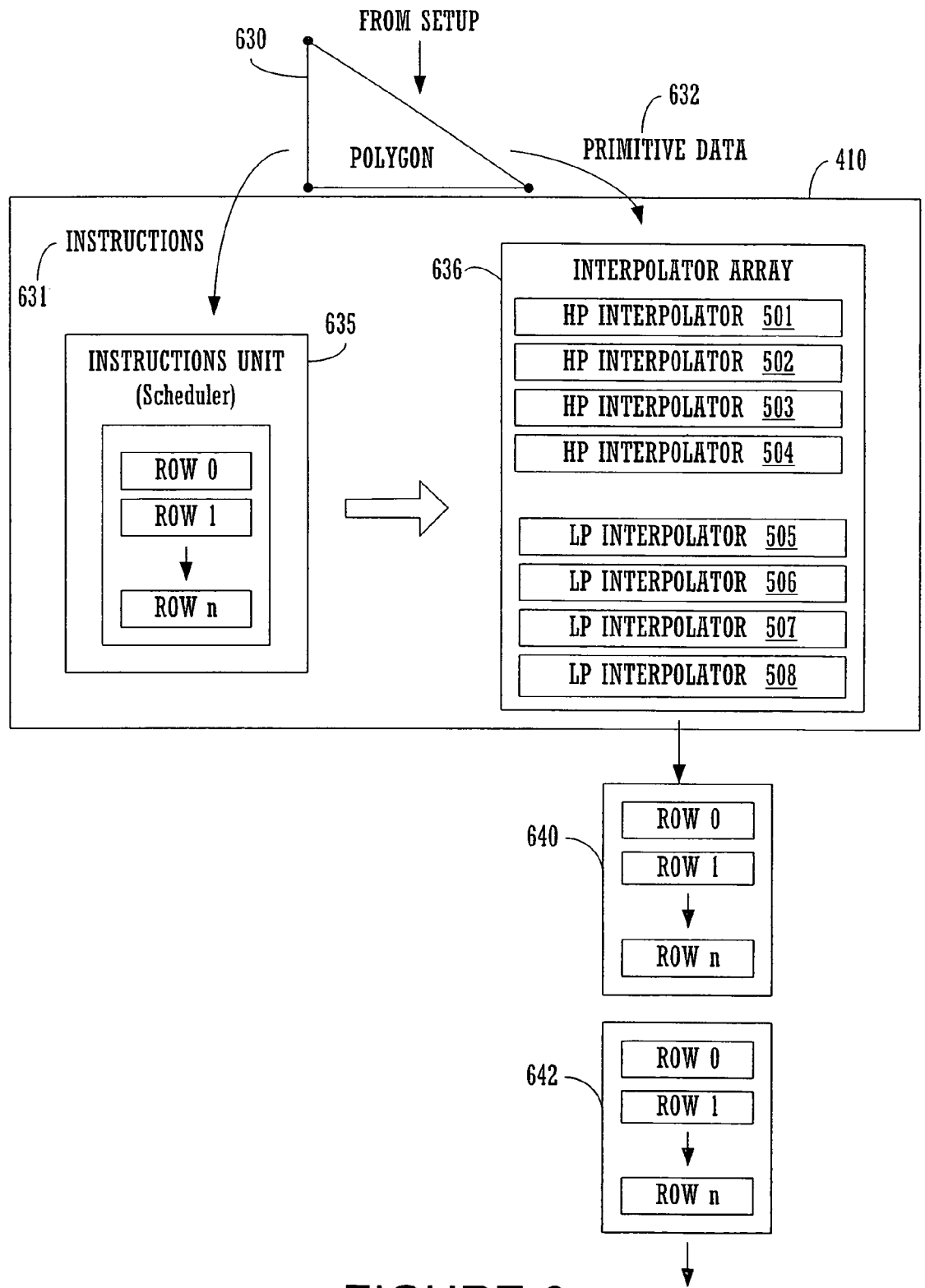
FIG. 6 shows an exemplary flow diagram depicting the process whereby graphics primitives are received from the set up stage and are converted into their constituent pixel packets by the raster stage in accordance with one embodiment of the present invention.

FIG. 6 shows a flow diagram depicting the process whereby graphics primitives (e.g., polygon 630) are received from the set up stage 405 and are converted into their constituent pixel packets by the raster stage 410 in accordance with one embodiment of the present invention.

As described above, the raster stage 410 receives data from setup stage 405 regarding triangles (e.g., polygons) that are to be rendered (e.g., converted into pixels). This is illustrated in FIG. 6 as the triangle 630 propagating down to the raster stage 410 from the set up stage 405. The triangle 630 comprises a geometric primitive having associated therewith instructions (e.g., instructions 631) indicating the manner in which the triangle is to be rasterized and rendered, and primitive data (e.g., parameter data such as color, texture coordinates, transparency, xy, depth, etc.).

The raster stage 410 includes an instruction unit 635 that receives and processes the instructions 631 associated with the triangle 630, and controls the manner in which the primitive data 632 is loaded and processed by the interpolator array (e.g., interpolators 501-508). The instructions 631 include raster interpolation instructions that control the manner in which the primitive data 632 of the triangle 630 is to be interpolated across each of the triangle's pixels. As described above, the parameters for each of the triangle's pixels are interpolated from the primitive data 632 associated with the triangle's vertices. The raster instructions 631 control which parameter (e.g., of the primitive data 632) is processed by which of the high precision interpolators (e.g., interpolators 501-504) or low precision interpolators (e.g., interpolators 505-508). In other words, the instruction unit implements a programmable software-based scheduler that schedules and allocates the parameter data interpolation computations to the interpolators 501-508 in accordance with the raster instructions 631.

The raster instructions 631 also control the locations where the interpolation results from the interpolators 501-508 will be loaded into each row of a generated pixel packet. The instruction unit 635 interacts with the packing logic 510 to implement the desired row load out.

In this manner, the raster instructions 631 control the building of the pixel packets of the triangle 630. For example, for each pixel of the triangle 630, the raster instructions 631 determine the parameter inputs for each of the interpolators 501-508, and also determine the row locations of the interpolated parameter outputs, fields for the pixel parameters required for subsequent processing (e.g., color, texture, depth, fog, etc.), and processing instruction sequence numbers for the subsequent operations for the pixel packet. In typical operation, one row of a pixel packet is formed each clock cycle. Thus, two row pixel packets are built in two clock cycles, three row pixel packets are built in three clock cycles, and accordingly, n row pixel packets are built in n clock cycles. As the pixel packets are formed (e.g., pixel packets 641-642), they are propagated to subsequent stages of the pipeline.

As described above, it should be noted that in one embodiment, the programming of the allocation of the primitive data 632 to the interpolator array 636 (e.g., which parameters are assigned to which of the interpolators 501-508) is programmable on a per polygon basis. For example, once the instruction unit 635 configures the interpolator array 636 to build the pixel packets of the triangle 630, that configuration remains constant for each of the constituent pixels of the triangle 630.

Figure 7:
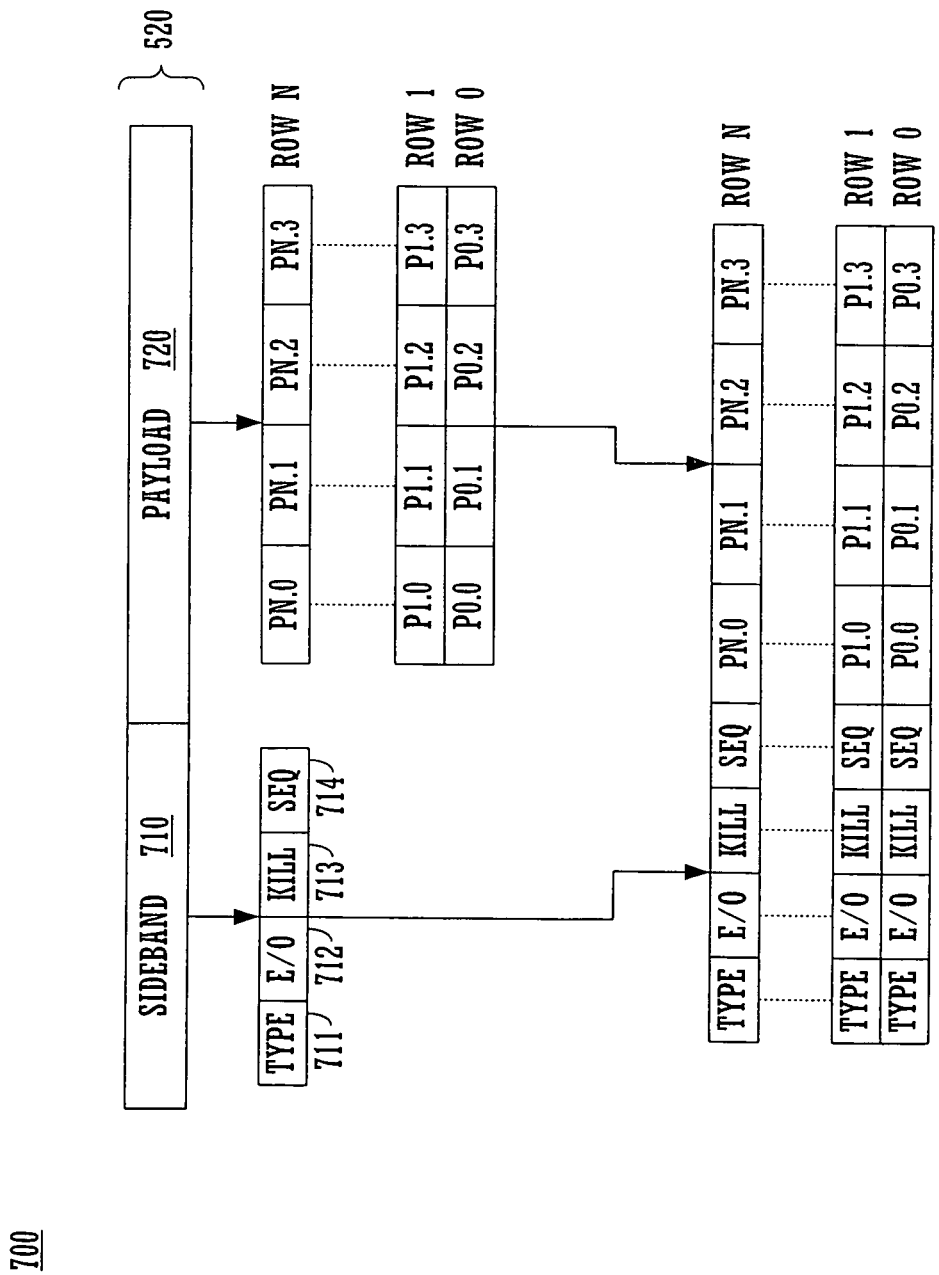
FIG. 7 is a data flow diagram showing the processing of a pixel packet in a pipeline in accordance with one embodiment of the present invention.

FIG. 7 shows a data flow diagram illustrating a pixel packet 520 in accordance with one embodiment of the present invention. As mentioned above, a pixel packet is, in general, a complete set of descriptions for a pixel in a graphical display. In the present embodiment, pixel packet 520 includes sideband information 710 and payload information 720. In one such embodiment, payload information 720 includes, for example, color information, depth information, and texture information for the pixel that is associated with pixel packet 520.

In the present embodiment, sideband information 710 includes a "type" field 711 of one or more bits. There may be different types of data packets flowing through the pipeline 400 of FIG. 4. The type field is used to identify pixel packet 520 as a row of a pixel packet containing pixel data.

In the present embodiment, sideband information 710 of FIG. 7 may include an "even/odd" (e/o) field 712. In one embodiment, the e/o field 712 is a single bit in length. Additionally, sideband information of FIG. 7 also includes a "kill" field 713. In one embodiment, the kill field 713 is a single bit in length. As mentioned above, if the kill bit is set somewhere in the pipeline 400 of FIG. 4, then the pixel packet will proceed through the remainder of the pipeline 400 without active processing.

In the present embodiment, the sideband information 710 of FIG. 7 includes a "sequence" field 714. In one embodiment, the sequence field is three bits in length. The sequence bits link pixel packet 520 to an instruction that is to be applied to the pixel packet in the subsequent stages (e.g. DF 430, ALU stages 440, and DW 455).

Continuing with reference to FIG. 7, in the present embodiment, the data in payload portion 720 of pixel packet 520 is separated into one or more "rows" 0, 1, . . . , N in raster stage 310 of FIG. 3. That is, the payload portion 720 may consist of a single row of data, or it may consist of a group of rows.

The sideband information 710 for pixel packet 520 is associated with each row or rows formed from the payload portion 720. In one embodiment, each row includes the sideband information 710 and 80 bits of pixel data, as illustrated in FIG. 7.

Each row of pixel packet 520 is processed in succession in pipeline 400 of FIG. 4 with each new clock cycle. For example, row 0 starts down pipeline 400 on a first clock, followed by row 1 on the next clock, and so on. Once all of the rows associated with pixel packet 520 are loaded into pipeline 400, rows associated with the next pixel packet are loaded into pipeline 400. In one embodiment, rows of pixel data for one pixel packet are interleaved with rows of pixel data from the next pixel packet. By interleaving rows of pixel packets in this fashion, stalls due to functional unit latencies in the pipeline 400 can be avoided.

Figure 8:
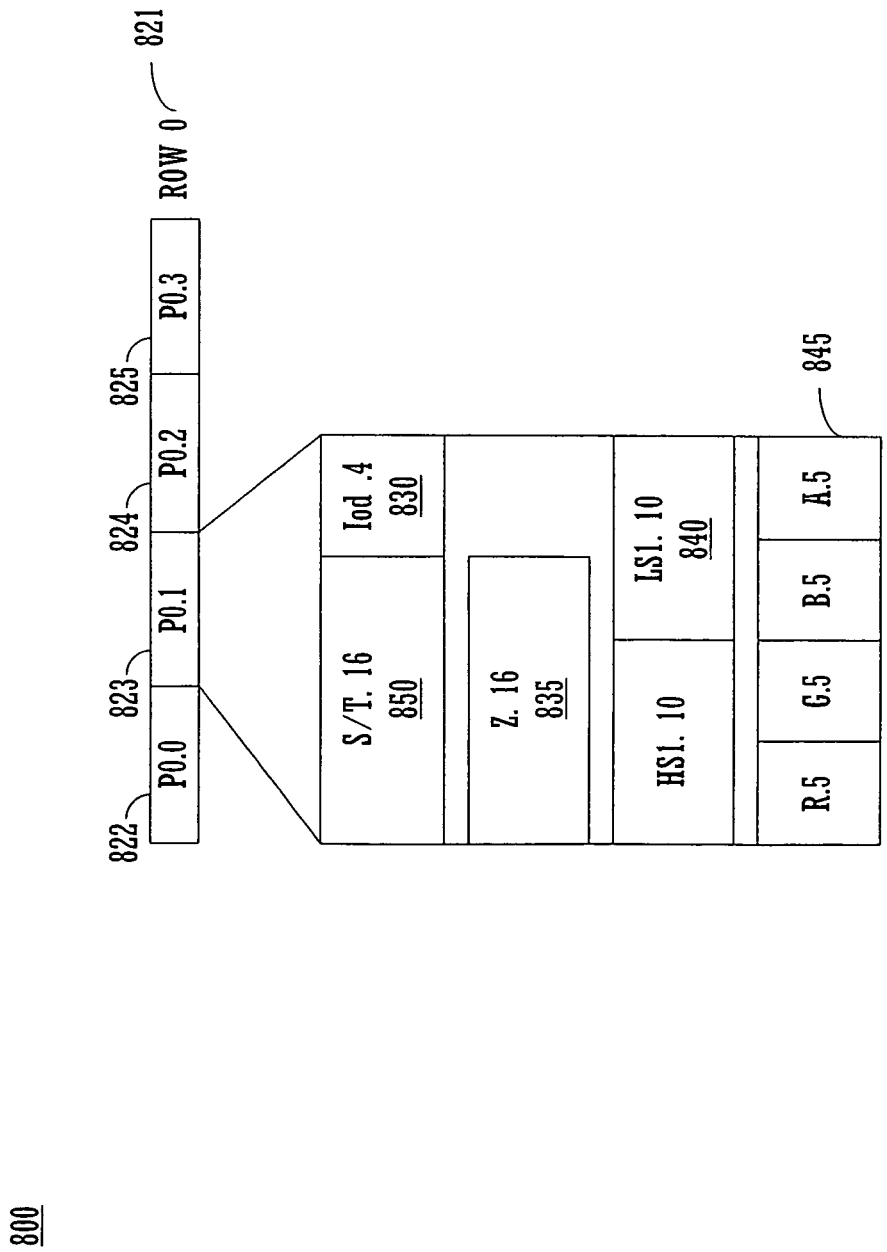
FIG. 8 is a block diagram of pixel data loaded into a register is shown in accordance with one embodiment of the present invention.

With reference now to FIG. 8, a block diagram of pixel data loaded into a register is shown in accordance with one embodiment of the present invention. The pixel data in each row 821 is 80 bits in length. In one such embodiment, the pixel data in each row 821 is represented using four (4) sets of 20-bit values (e.g., 822-825). Each of the sets of 20-bit values may represent one or more instances of pixel data. Examples of pixel attributes that may be included in a 20-bit set of pixel data include, but are not limited to: 16-bit Z depth values 835; 16-bit (s,t) texture coordinates 850 and a 4-bit level of detail value 830; a pair of color values 840, each with ten (10) bits of precision (e.g., 10 bits high precision and 10 bits low precision); or packed 5555 RGBA 845 (red, green, blue, alpha) values, each five (5) bits in length. The particular data layout or packing format depends on how the interpolators are programmed by the raster instructions for the primitive.

As described herein, the instructions commanding the iterating (e.g., the 4 high precision 4 low precision instructions) are assigning one of the 4 high precision interpolators to take one parameter that the pixel setup stage 405 is sending and perform the interpolation on it. Moreover, the destination in the instruction indicates how to pack the interpolated data in the row 821. For example, the raster stage 410 walks pixel-by-pixel across the geometric primitive (e.g., triangle or the like) interpolating all parameters and packing them into an 80 bit value for flowing down the pipeline 400.

In one embodiment, the raster stage 405 can perform the 4 high precision and 4 low precision iterated values per clock. The software operating on the raster stage 405 will program the interpolators with the clock length of the pixel. For example, if the pixel packet will take only one row 821 of 80 bits, or if it has enough texture to require a plurality of rows 821 to contain all the data for the pixel. Moreover, the assignment of the pixel data to the 20-bit set (e.g., 822-825) of the row 821 may also be changed per geometric primitive. That is, the assignment and instructions per geometric primitives are fixed in the raster stage 405, but they are variable between geometric primitives.

Figure 9:
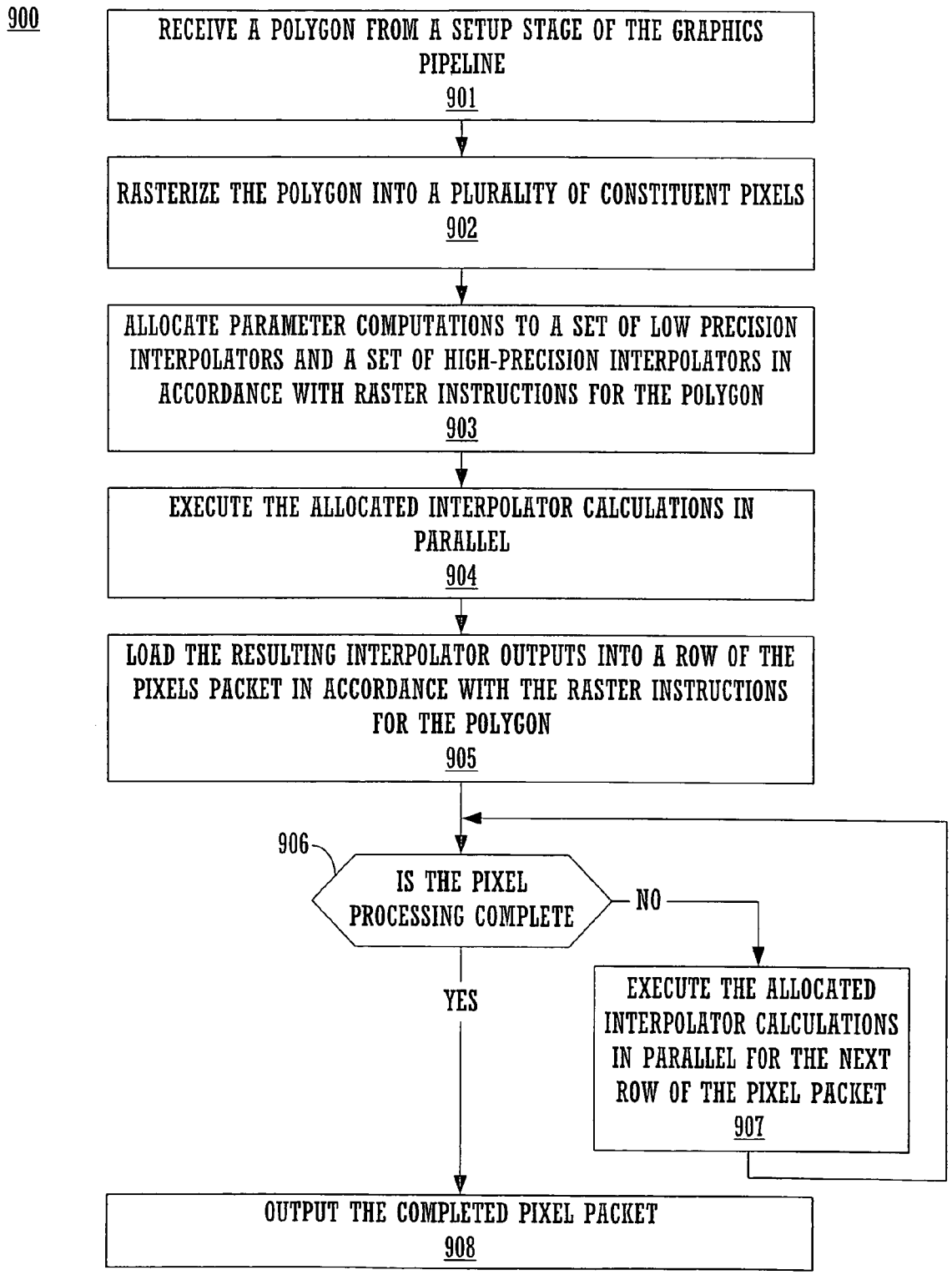
FIG. 9 shows a flowchart of the steps of the process in accordance with one embodiment of the present invention.

FIG. 9 shows a flowchart of the steps of the process 900 in accordance with one embodiment of the present invention. As depicted in FIG. 9, process 900 illustrates the steps involved in the build out of a flexible pixel packet by raster stage 410 in accordance with one embodiment of the present invention.

Process 900 begins in step 901, where the raster stage 410 receives, or otherwise accesses, a polygon from the set up stage 405 of the graphics pipeline. In step 902, the polygon is rasterized into a plurality of constituent pixels. In step 903, parameter computations for the pixels are allocated to a set of low precision interpolators (e.g., interpolators 505-508) and a set of high precision interpolators (e.g., interpolators 501-504) in accordance with raster instructions for the polygon. As described above, the polygon comprises constituent geometric primitive data and associated raster instructions (e.g., that control the build out of the pixel packets for the polygon). An instruction unit 635 within the raster stage 410 configures the interpolators 501-508 to process the pixels of the polygon and build the pixel packets.

In step 904, the allocated interpolator calculations are executed in parallel. In step 905, the resulting interpolator outputs are loaded into a row of a pixel packet in accordance with the raster instructions for the polygon. As described above, the instruction unit 635 configures the packing logic 510 to build the pixel packet row in the specified manner. In step 906, if the pixel processing is complete, in step 908, process 900 outputs the completed pixel packet to the subsequent stages of the graphics pipeline. Otherwise, process 900 proceeds to step 907, and executes the allocated interpolation calculations in parallel for the next row of the pixel packet. In this manner, successive rows of the pixel packet are built until the pixel's description is complete. As described above, a simple 3D scene can often have one row per pixel packet, while a comparatively complex scene can have two, three or more rows per pixel packet.

Figure 10:
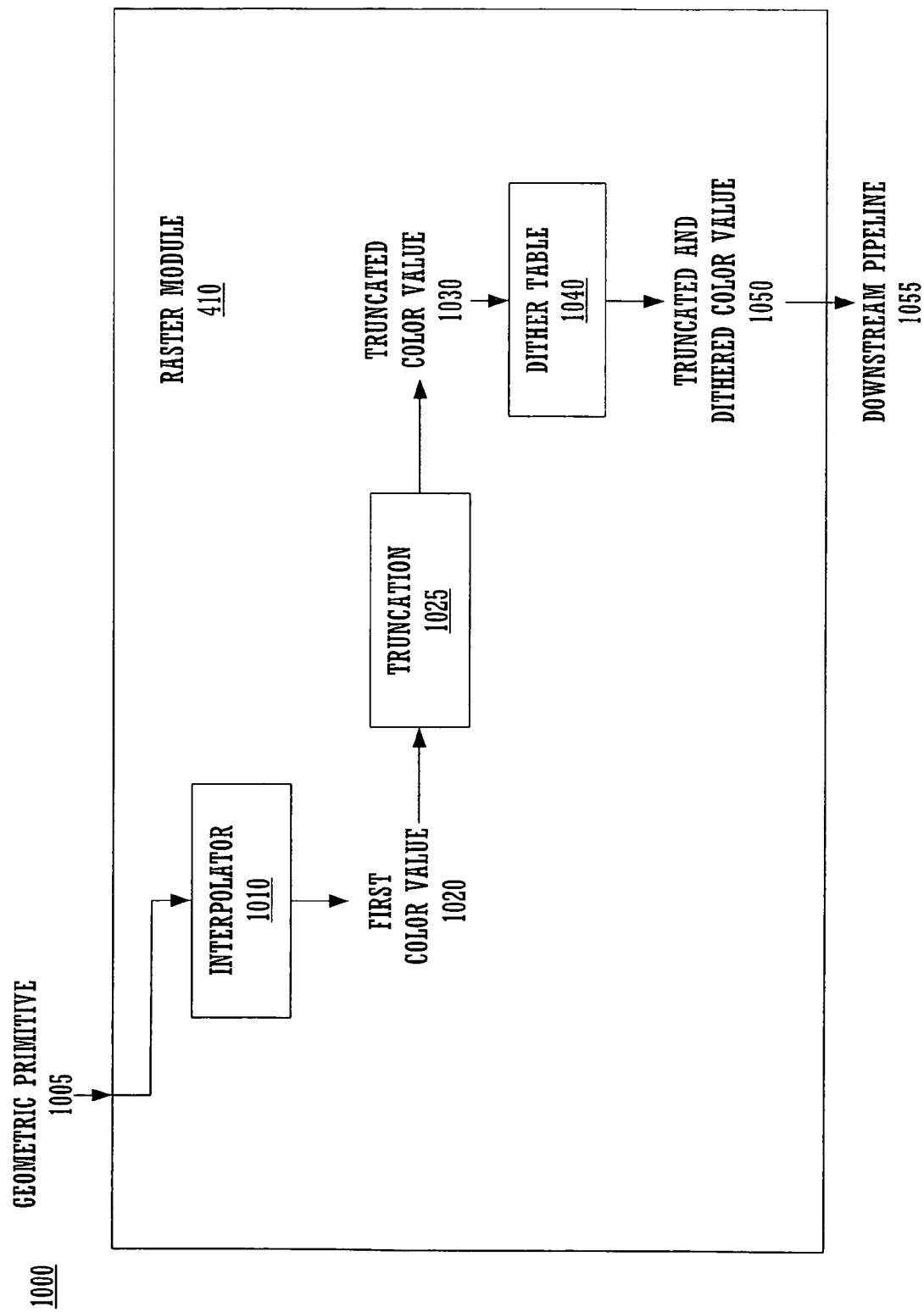
FIG. 10 illustrates a data flow diagram for reducing color value size in accordance with one embodiment of the present invention.

With reference now to FIG. 10, a data flow diagram of a method for reducing color value size is shown in accordance with one embodiment of the present invention. Specifically, FIG. 1000 shows a geometric primitive 1005 of any size (e.g., a triangle) entering the raster module 410 of the present invention. As the geometric primitive 1005 enters the rasterizing module 410 of the graphics pipeline, the rasterizing module 410 interpolates the geometric primitive 1005 via interpolator 1010 to produce a first color value 1020. In general, the interpolator 1010 interpolates the geometric primitive in a pixel-by-pixel manner to transform the data from geometric primitive 1005 data to pixel data. In one embodiment, the first color value 1020 is a high bit color value (e.g., 8-bit or greater).

The first color value 1020 is then truncated at the truncation 1025 portion of the raster module 410. In general, truncation removes the least significant bits from a set of bits. For example, the truncation 1025 portion may truncate the first color value 1020 (e.g., an 8-bit color value) to produce a truncated color value 1030 (e.g., a 5-bit color value). The rasterizing module 410 then utilizes a dither table 1040 to dither the truncated color value to produce a truncated and dithered color value 1050. In general, dithering is used to reduce the banding effect normally associated with truncated color values 1030. The truncated and dithered color value 1050 is then propagated from the rasterizing module 410 and enters the remainder of the downstream pipeline 1055. In so doing, the power use is minimized regarding propagation of and processing of the color values. It should be noted that the selection of said truncation and/or dithering may be a programmable attribute, such that software applications can choose whether to use the full color precision or the truncated/dithered version of the color value, assuming the remainder of the pipeline is likewise programmable. This is desirable since simple pixels (i.e. pixels which are only using interpolated color values) may need higher precision to be visually pleasing, while complicated pixels (i.e. pixels which involve many processing steps such as texturing, fog, etc.) have a lower total contribution from iterated color and thus have less need of full color precision in order to maintain high overall visual quality. It is further desirable to allow the choice of dithering to be independent of the choice to truncate the color value since some graphics APIs (i.e. OpenGL) require this flexibility.

Figure 11:
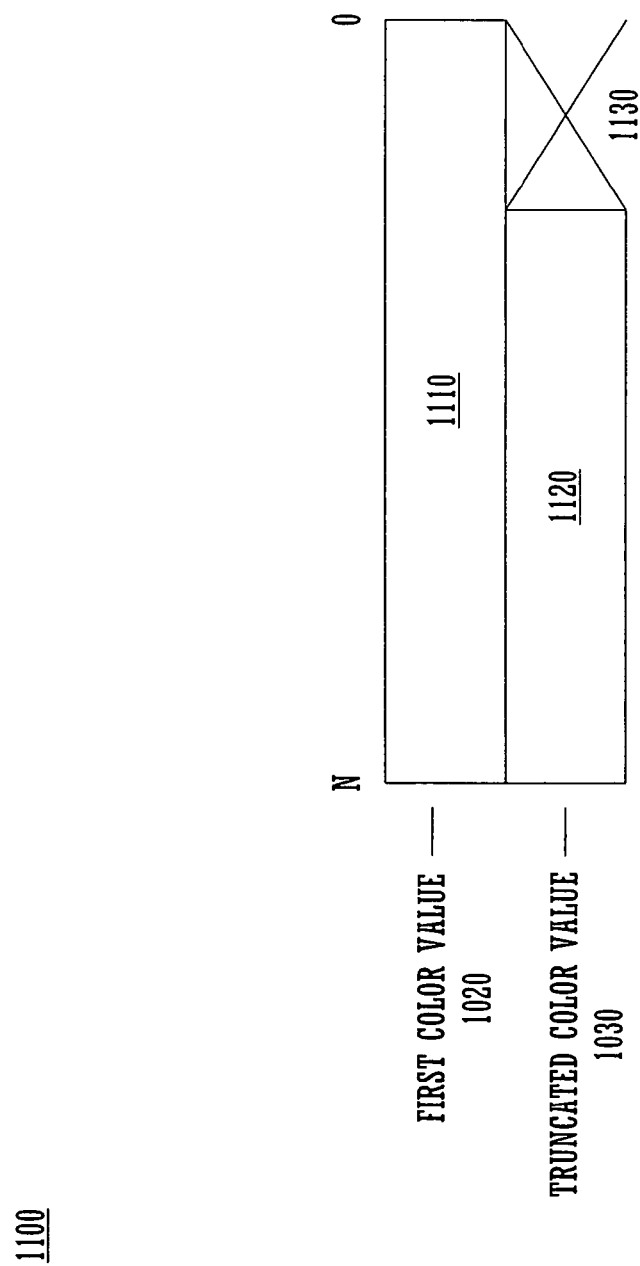
FIG. 11 is a block diagram of a color value reduction in accordance with one embodiment of the present invention.

With reference now to FIG. 11, a block diagram of a color value reduction, via truncation, is shown in accordance with one embodiment of the present invention. In general, diagram 1100 illustrates a first color value 1020 having N bits with a length of 1110. In the reduced file 1120, a portion of the transformed color value 1030 has been truncated or removed. The resulting 1120 is therefore smaller and easier to process than the original N-bit file.

For example, the original file size 1110 may be 8-bits, e.g., N would be eight, color value 1130 may be three bits wide and would result in a truncated color value size 1120 of 5-bits. The 5-bits would then be processed through the pipeline. It is noted that the 5-bits is simply one of the plurality of possible truncated size options. Moreover, it is well known that the color value 1110 or 1120 bit size is per color. That is, 1110 (or 1120) may be a red color value, or blue color value, or green color value, or any other parameter desired by the designer. However, it is only a single color value and other color values are treated in the same way. Therefore, if the graphics pipeline used a three-color application, in one embodiment, there would be three 1120-bit sections to be processed through the pipeline. Not a single 1120 bit section covering all the colors.

Figure 12:
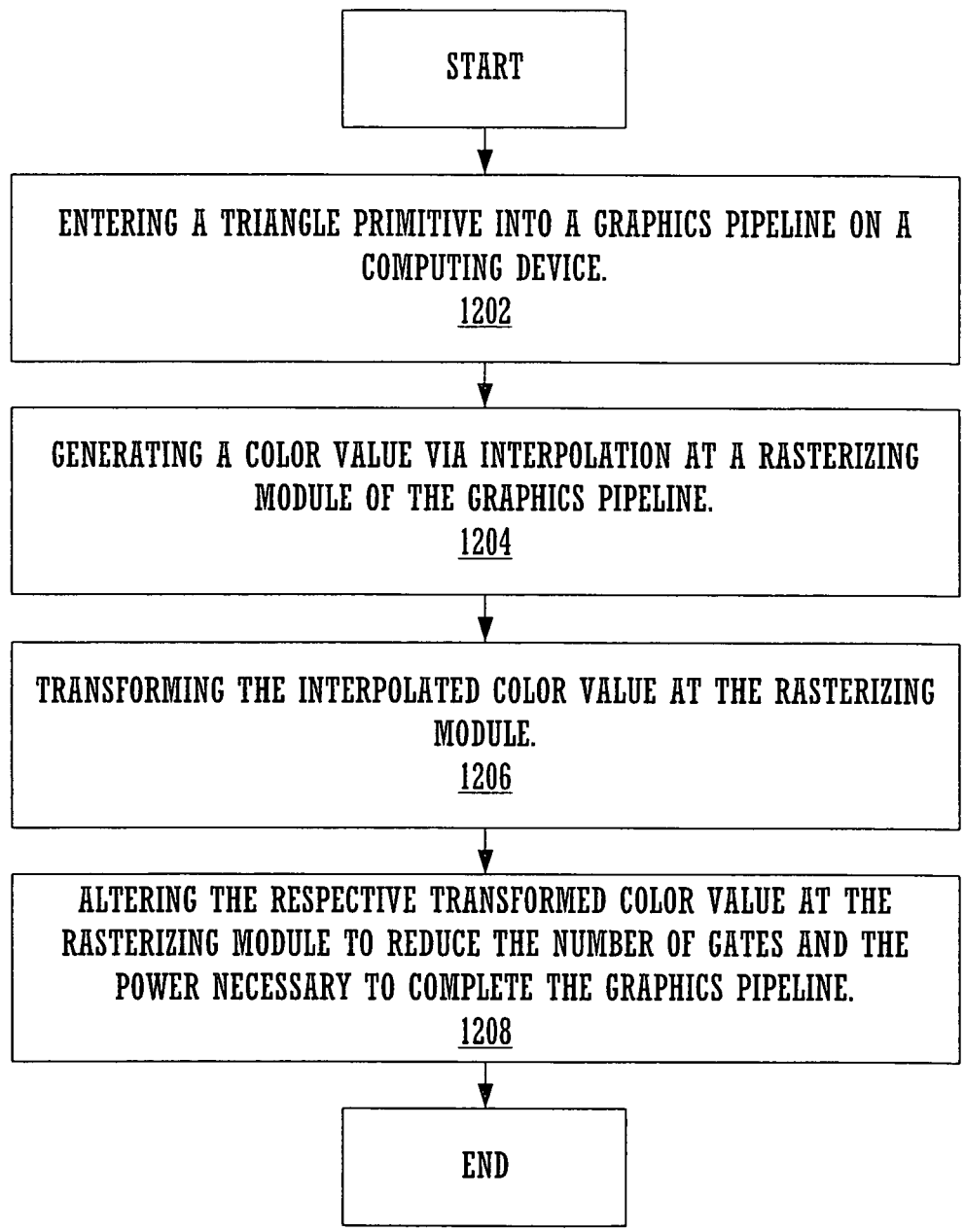
FIG. 12 is a flowchart of an exemplary process for reducing power consumption for graphic architecture on a handheld computing device in accordance with one embodiment of the present invention.

With reference now to FIG. 12, a flowchart 1200 of a process for reducing power consumption for graphic architecture on a handheld computing device is shown in accordance with one embodiment of the present invention that uses reduced bit width color values.

Referring now to step 1202 of FIG. 12, a triangle primitive is received by the raster stage 410 from the setup stage 405 of the graphics pipeline (e.g., graphics pipeline 205). As described above, the triangle has a number of parameters that control the manner in which its constituent pixels are rendered by the graphics pipeline of the hand held computing device. As stated herein, the handheld computing device may be a mobile phone, pager, personal digital assistant, or the like. Moreover, the graphics pipeline may be a plug-and-play component coupled with the processor or logic of the handheld computing device. In another embodiment, the graphics pipeline may be fixedly coupled with the handheld computing device at the time of manufacture.

With reference now to step 1204 of FIG. 12 and to FIG. 10, in one embodiment, a color value 1020 is generated via interpolation at interpolator 1010 of rasterizing module 410 of the graphics pipeline. As stated herein, the color value 1020 may be of any size, e.g., 8-bit, 16-bit, 32-bit, or the like. In one embodiment, the computing of pixel parameters includes interpolating the geometric primitive 1005 including a plurality of vertices wherein each vertex has a respective color value, and the interpolating is performed by an interpolator portion 1010 of a rasterizing module 410. For example, the rasterizer initially interpolates a respective color value for each pixel of the geometric primitive, wherein the respective color value is of a first bit width (e.g., 8-bits, 16-bits, 32-bits, etc.).

Referring now to step 1206 of FIG. 12 and to FIG. 10, in one embodiment, the interpolated color value 1020 is truncated at the truncation portion 1025. In one embodiment, the truncation may result in a truncated color value 1030 reduced to a second bit width to produce a respective truncated color value. In one embodiment, the second bit width may be any number of bits between 2 and 7. As is well known in the art, truncation is simply the reduction of the possible number of variations for a color. For example, a color block or file may be introduced to the truncating portion 1025 as a variation of red. The initial color reference may be pink (e.g., 8-bit color), during the truncation process at the truncation portion 1025, the new color reference (e.g., truncated color value 1030) may be light red (e.g., a 5-bit color). In this case, the least significant 3 bits are discarded. Therefore, as is well known in the art, the color value size and actual reference color has been changed.

With reference now to step 1208 of FIG. 12 and to FIG. 10, in one embodiment, the resulting truncated (e.g., transforming, or the like) color value 1030 is altered (e.g., dithered or the like) by the dither table 1040. For example, the transformed color value 1030 may be dithered using a screen location based dither table 1040 to produce a truncated dithered color value 1050. Additionally, the respective truncated dithered color value 1050 may be propagated to downstream modules 1055 of the graphics pipeline. In one embodiment, the screen-location based dither table 1040 returns a dither value based on a screen position of each pixel and wherein the dither value is used to alter the respective color value of each pixel to prevent visual artifacts that may result from the color formations.

As is well known in the art, dithering is the process that is used to improve the image when the full range of colors in a particular image are not available (e.g., due to truncation or reduced palette size). For example, if a gradient is to be displayed and the system does not have the resources to display all of the shades that make up the gradient, then the image (or colors) are dithered. That is, the remaining colors are mixed in such a way as to recreate the missing colors by trading spatial resolution for color resolution. For example, if the called for color is pink, the raster module 410 may intersperse a few white pixels within a plurality of red pixels. In so doing, the eye blends the interspersed white with the red and "sees" pink. Thus, in the gradient example, the color smoothly transitions from red to white via the introduction of more white and less red interspersed throughout the gradient. This can be based on the screen location of the pixel being dithered.

By producing a truncated dithered color value 1050 at the rasterizing module 1025, the number of gates and the power necessary to complete the pipeline of the graphics pipeline on the handheld computing device is reduced.

In addition to the truncation and dithering of color values, in one embodiment, the rasterizing module 410 can truncate and dither iterated color values. Moreover, the rasterizing module 410 may apply mathematical operations to the iterated color values after truncating and dithering the files.

Figure 13:
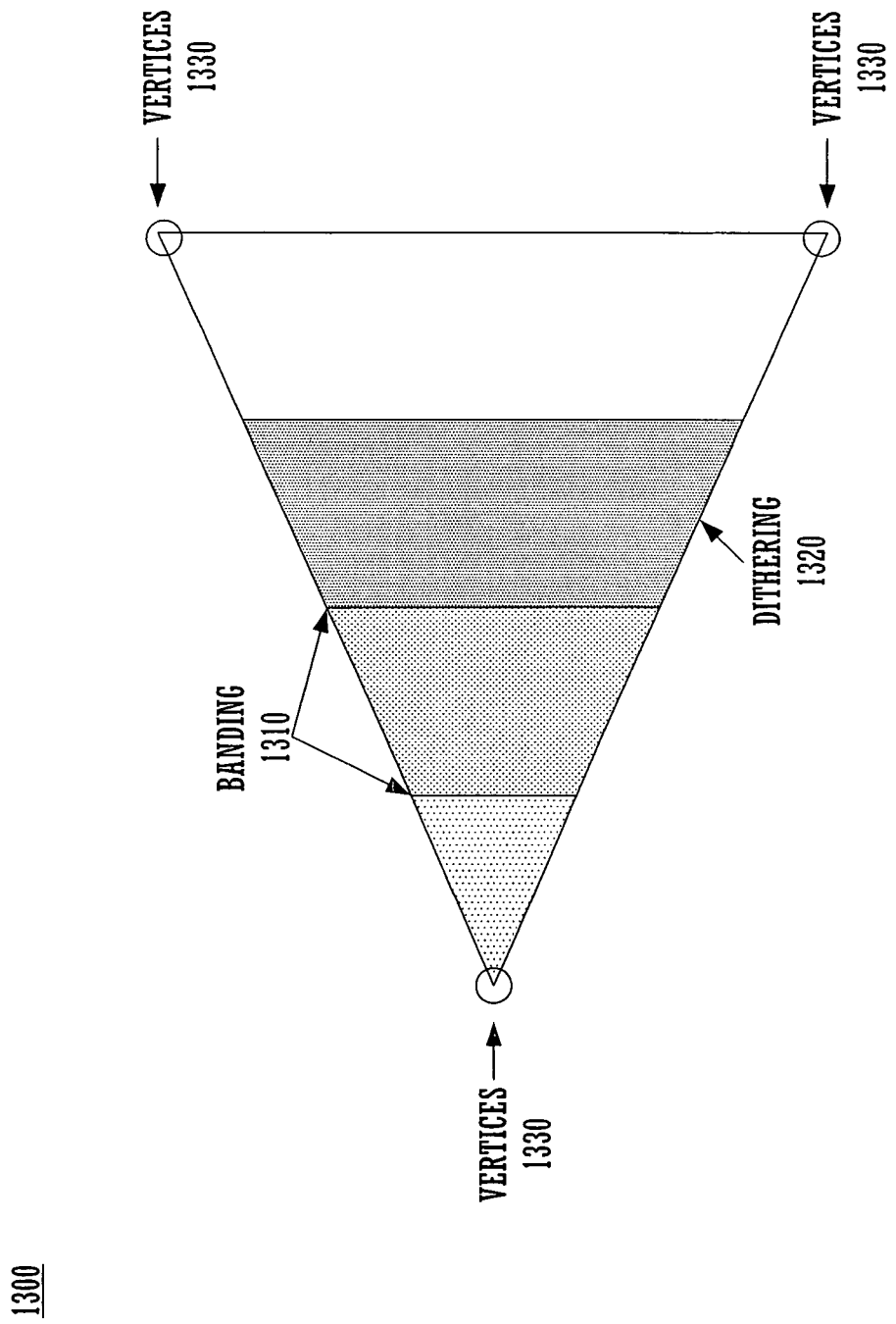
FIG. 13 is a block diagram of a geometric primitive in accordance with an embodiment of the present invention.

With reference now to FIG. 13, a block diagram of a geometric primitive is shown in accordance with an embodiment of the present invention. In general, the geometric primitive is, in one embodiment, a triangle with three vertices 1330. As is well known in the art, the three vertices 1330 are the coordinates necessary to establish the a triangle. The banding issues 1310 are shown in the color variation of geometric primitive 1300. The bands are caused by the reduction in bit-color and the resulting reduced color palate. The dithering portion 1320 illustrates an exemplary embodiment of dithering resulting in a smoother apparent color transition on a limited color palate. Although one version of dithering is shown, there are numerous dithering methods which are well known in the art, and which may be used by the present invention.

Figure 14:
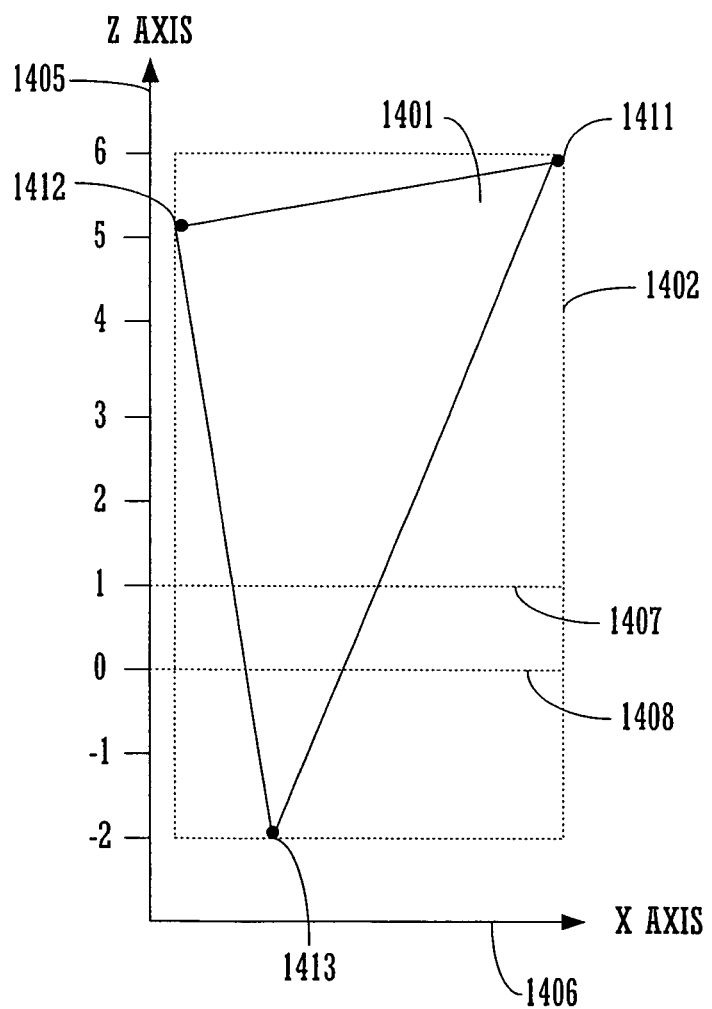
FIG. 14 shows a diagram depicting a polygon and a bounding box as used in a clamped z value interpolation process in accordance with one embodiment of the present invention.

FIG. 14 shows a diagram depicting a polygon 1401 and a bounding box 1402 as used in z value interpolation process in accordance with one embodiment of the present invention. As depicted in FIG. 14, the polygon 1401 is shown with respect to a z axis 1405 and x-axis 1406. The y axis (not shown) is orthogonal to the z axis 1405 and the x-axis 1406.

In one embodiment, the raster stage 410 accesses the primitives comprising the polygon 1401 (e.g., triangle) and-rasterizes the triangle into its constituent pixels. The bounding box 1411 is used by the rasterizer module (e.g., rasterizer) of the raster stage 410 in the rasterization process of the triangle 1401. Associated parameters for each pixel are then interpolated from the vertices 1411-1413. These parameters include a depth parameter, z. During rasterization of the triangle 1401, respective z values are interpolated by the raster stage 410 for each pixel of the triangle 1401. Each z value is represented within a predefined numerical range (e.g., an integer portion of zero and a fractional portion ranging from zero to one) which substantially corresponds to a depth range between a near clipping plane 1408 and a far clipping plane 1407, as related to a view volume. Z values outside the clipping planes are not screen displayable positions.

As is generally known, the z values between the near clipping plane 1408 and the far clipping plane 1407 comprise the inner and outer boundaries of the view volume. Thus triangle 1401 may have a significant portion that is further from the viewpoint than the far clipping plane 1407 (e.g., those z values greater than one) and/or a significant portion which is closer than the near clipping plane 1408 (e.g., those z values that are less than zero). In this manner, the normal Z range is for those pixels which contribute to the scene is 0.0 to 1.0

(e.g., between the near and far clipping planes). Accordingly, the bounding box 1402 extends significantly beyond this range.

In one embodiment, the raster stage 410 takes advantage of the fact that the valid range for the z value is modular, ranging from 0.0 to 1.0, and repeats consistently and deterministically as is the integer value of the z parameter increases or decreases. For example, in the prior art, a graphics pipeline would need to accommodate a very large range for z values that extend beyond the valid range. In contrast, in the raster stage 410, during the iteration of the z values for each pixel, the fractional portion of the z values are allowed to "roll over" within this modular framework and repeat with each new integer increment or decrement, and the integer value is allowed to increment and decrement outside the valid range (e.g., increment above one and decrement less than zero). A flag can be recorded when the Z value is determined to be outside the near/far clipping planes.

Thus, for example, even though a z stepper of the raster stage 410 may begin at −2.0 z value, by the time the raster stage 410 steps into the view volume (e.g., z values between 0.0 and 1.0) the fractional portion will behave correctly and consistently. Similarly, in a case where the z stepping process begins at positive 6.0 z value, the fractional portion of z will consistently and deterministically roll over as the integer value steps from 6.0 to 0.0. It is possible to take advantage of this behavior because other separately iterated parameters (the barycentric coefficients) determine which pixels are within the two-dimensional x, y projection of the primitive. Rasterizing correct z values is only important within this two-dimensional projection of the primitive in the x,y plane; outside of this region the z stepper need only act as an error term such that the correct z values are generated once the rasterizer steps into the triangle.

The modularity characteristic of the z stepping function allows the integer portion to increment and decrement as necessary, while the raster stage 410 need only keep accurate track of the modular fractional portion of z (e.g., from 0.0 to 1.0). For example, if z is increasing outside the view volume, positive integers can be discarded. Similarly, if z is decreasing outside the view volume, negative integers can be discarded. This allows the raster stage 410 to use fewer bits for the integer portion of z (e.g., outside the 0.0 to 1.0 range). In both cases, some number of integer z bits (e.g., three bits) can be retained as a multi-bit indicator to indicate when the z stepping process is in the positive or negative range outside the view volume. This is necessary since in general the z stepper will not be exactly precise in relation to the other coefficients which precisely determine pixel membership in the two dimensional x,y projection of the triangle (i.e. the barycentric coefficients). In this manner, the z parameter values produced by the z stepping process are clamped to remain substantially within the valid range of the view volume for transitional pixels at the edges of the primitive.

In one embodiment, for a 1K pixel screen, 16 z bit precision (e.g., a 16-bit wide depth buffer) is used to track the fractional z value and 10 error bits are used (e.g., in order to have less than one part in a thousand z error for a maximally sized primitive). Additionally, two or three error bits can be used for the integer portion. These bits will indicate the sign of the z value (e.g., when the z value is outside either the near or far plane), and become guard bits to indicate when the z stepping process penetrates the near or far clipping planes. The number of indicator bits selected determines the allowable multiple of the 0 to 1 z range at which true clipping must be performed on a primitive if any of the z values at the vertices exceed said range (e.g. for three indicator bits, primitives with z values between −3.0 and +3.0 can be rasterized correctly). Note that due to the modular nature of the z fractional bits, this is only a requirement for pixels which are inside the two dimensional x,y projection of the triangle (it is still possible to iterate "outside" pixels correctly even when they exceed the multiple of the z range since the z value will roll over into the legal range prior to stepping into an "inside" pixel).

In one embodiment, the z stepping process implemented by the raster stage 410 can be used to implement a per pixel clipping process. As is well-known, traditional clipping is a computationally expensive process. The integer guard bits enable a per pixel clipping process, whereby the geometric computations involved in a traditional clipping process are avoided. For example, those pixels having a z value greater than 1.0 are further than the far clipping plane 1407 and are outside the view volume, and can be discarded or bypassed. Similarly, those pixels having a z value less than 0.0 are inside the near clipping plane and can similarly be discarded or bypassed. In this manner, if the iterated z value of a pixel is outside the clamped range, that pixel can essentially be clipped, thereby performing clipping at the pixel level as opposed to the polygon level. Per pixel clipping is less computationally expensive than traditional per polygon clipping. It should be noted that in addition to clipping, the clamped z value stepping process can be beneficial to other types of rendering operations, such as, for example, stencil shadows.

Thus, the z stepping logic of the raster stage 410 can be designed to compute the z values with less precision in comparison to typical prior art implementations, while the devoting a larger domain to the z value range within the near/far clipping planes. For example, while traditional z stepping logic needed to be implemented with 56 bits (e.g., for a 1K pixel screen), z stepping logic in accordance with one embodiment of the present invention can be implemented with 29 bits (e.g., 3 guard bits, 16 z bits, and 10 error bits). This makes hardware significantly less expensive in terms of silicon area consumed and in terms of power requirements, while devoting excellent resolution to the range between the near/far clipping planes.

FIG. 15 shows a flowchart of the steps of an exemplary process 1500 in accordance with one embodiment of the present invention. As depicted in FIG. 15, process 1500 illustrates the steps involved in a clamped z value interpolation process in accordance with one embodiment of the present invention.

Process 1500 begins in step 1501, where the raster stage 410 accesses a geographic primitive comprising a plurality of vertices of a polygon. In step 1502, the primitive is rasterized into a plurality of corresponding pixels. In step 1503, the raster stage 410 computes z parameter values for each pixel of the polygon, wherein each z parameter value comprises an integer portion and a fractional portion.

In step 1504, the integer portion of the z parameter is clamped to a valid range (bit width) plus a guard indicator (e.g., a small number of integer bits) to indicate the sign of the z parameter. Additionally, in step 1504, the computed z values are allowed to roll over within the valid range upon an overflow condition. This sets the guard bit to indicate overflows. In step 1505, per pixel clipping is implemented using the guard indicator of the z parameter. As described above, the guard bits can indicate those pixels which are further than the far clipping plane (e.g., far clipping plane 1407) or closer than the near clipping plane (e.g., near clipping plane 1408). These pixels can then be discarded or ignored in the rendering process. Optionally (e.g., under software control), such pixels can be clamped to the near or far z values instead of being clipped, which may be useful for some software algorithms.

Figure 16:
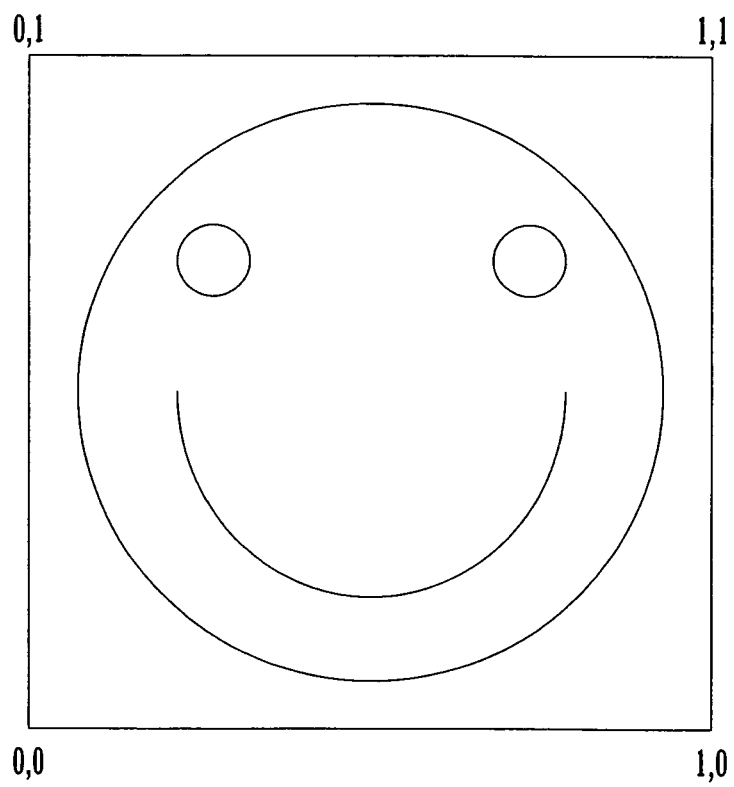
FIG. 16 shows a diagram of an exemplary texture map (e.g. a "texture") as used by embodiments of the present invention.

FIG. 16 shows a diagram of an exemplary texture map (e.g. a "texture") as used by embodiments of the present invention. As described above, embodiments of the present invention implementing parameter clamping to a valid range in a raster stage (e.g., raster stage 410) of a graphics pipeline. As parameters are computed by the raster stage 410 during the rasterization process, the raster stage 410 is configured to clamp parameter data to a valid range usable by the subsequent stages of the pipeline. The clamping functionality comprises discarding data that is outside the valid range of a given pixel parameter, thereby only sending the necessary parameter data, which minimizes the number of bits which need to be transmitted down the graphics pipeline, and thereby minimizing power expenditure.

In one embodiment, texture parameters are computed by the raster stage 410, and these texture parameters are clamped to a valid range. In other words, as texture coordinates are computed by the raster stage 410 (e.g., "s" and "t" coordinates), the computed textures are clamped to a valid range early in the pipeline (e.g., in the raster stage 410) as opposed to later in the pipeline.

FIG. 16 illustrates the coordinates (s,t) of the texture 1600. As generally known, the texture coordinates (s,t) range from zero to one in accordance with well-established convention. Accordingly, the coordinates at the lower left corner of the texture 1600 are "0,0" while the coordinates at the upper right corner of the texture 1600 are "1,1" and so on. Thus, a fractional representation, ranging from zero to one, is the information required by the data fetch stage 430 to access the texture 1600 (e.g., in memory) and retrieve the corresponding texels for the computed coordinate. A pixel may have one or more texture coordinates associated with it. Clamping refers to the fact that even though a deterministic formula may be used to compute texture coordinates, and even though this formula may result in both an integer portion and a fractional portion, only the fractional portion is required by the data fetch stage 430.

In one embodiment, the fractional portion is represented as a 16-bit value. In a typical implementation, the 16 bit each s and t coordinates of the texture map are used to fetch the addressed texel and one or more adjacent texels for a blending operation. The fractional portion allows the data fetch stage 430 to fetch the correct adjacent texels for the blending interpolation.

In one embodiment, the raster stage 410 computes texture coordinates in accordance with a "wrap" texture mapping mode. In the wrap mode, the texture 1600 repeats itself as the integer portion of the computed texture increments or decrements. In the wrap mode, at the edges of the texture 1600 (e.g., s or t at 1 or 0), the data fetch stage 430 fetches adjacent texels from the adjacent edge of the next repeating version of the texture map to do the interpolation. In this way, the textures wrap around without visible seams or artifacts.

In another embodiment, the raster stage 410 computes texture coordinates in accordance with a "clamp" texture mapping mode. In the clamp mode, the fractional portion does not wrap around. At the edges, the texture is clamped to the value at the edge. In the clamp mode, the texel colors are replicated or "smeared" off and repeated for any value that is greater than 1 or less than 0.

Operation in the clamp mode needs to be identified to subsequent stages in the pipeline. In one embodiment, an additional bit (e.g., a clamp flag or clamp bit) is sent down the pipeline to identify the clamp mode of texture mapping. The bit for each pixel can be transmitted as side band information in the manner described above. This information is used by the data fetch stage 430 during its texture fetch in order to configure itself not to fetch "wrap around" adjacent texels of the edge of the texture to do interpolation. The clamp mode is typically is programmed by an application through a graphics API.

It should be noted that in another embodiment, the raster stage 410 can be configured to compute texture coordinates in accordance with a "mirror" mode, where the texture coordinates are mirrored with different integer version of the texture coordinate value (e.g., those s and t values that are outside the range zero to one). As with the clamp mode, the mirror mode is identified to subsequent stages of the pipeline (e.g., through the use of a flag or bit).

In this manner, the raster stage 410 performs parameter clamping, wherein computed parameters are clamped to their valid range to save on the number of bits/information that needs to be pushed down the pipeline. In this case, the clamping involves discarding the integer portion of the computed texture coordinates and only sending the fractional portion within the range 0-1. This work is performed in the raster stage 410 as opposed to other later stages in the pipeline. The clamping functionality only sends the necessary parameter data, which minimizes the number of bits which need to be transmitted down the graphics pipeline, and thereby minimizing power expenditure.

Figure 17:
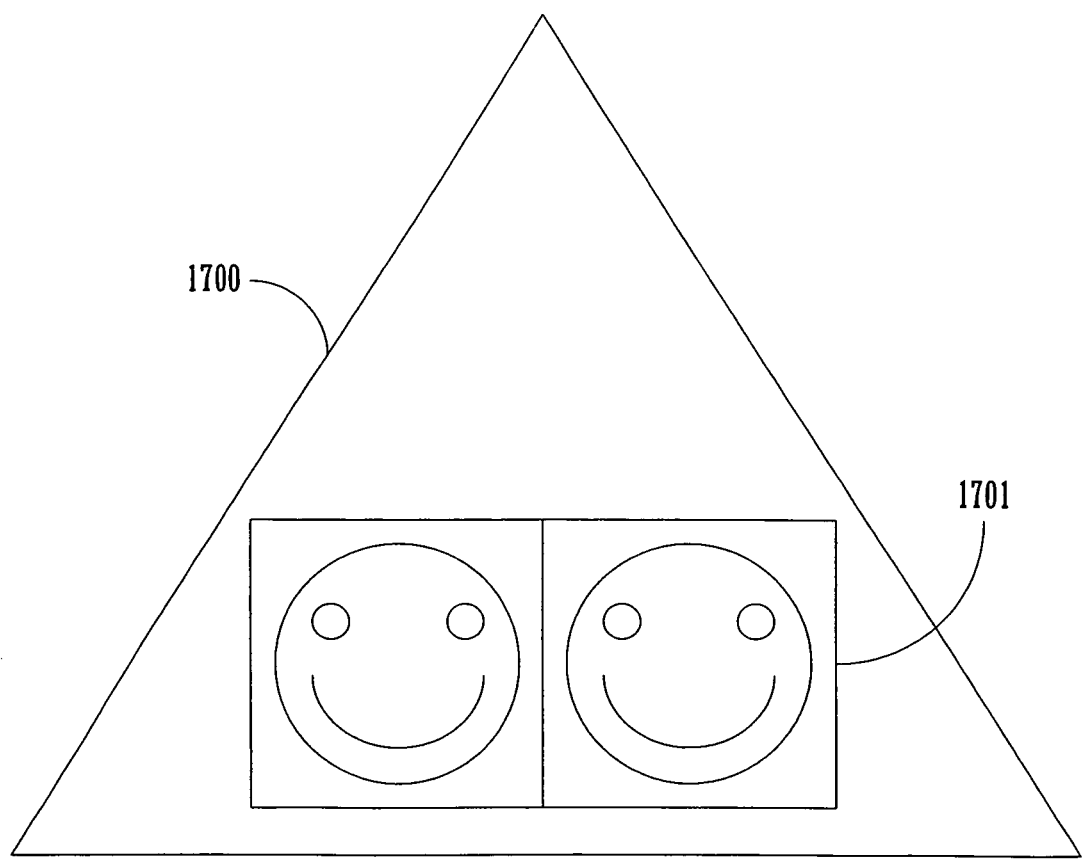
FIG. 17 shows a polygon having a wrapped version of a texture applied in accordance with one embodiment of the present invention.

FIG. 17 shows a polygon 1700 having a wrapped version of the texture 1600 applied (e.g., as indicated by the arrow 1701). As described above, the wrapped version of the texture repeats itself as the coordinates are computed.

Figure 18:
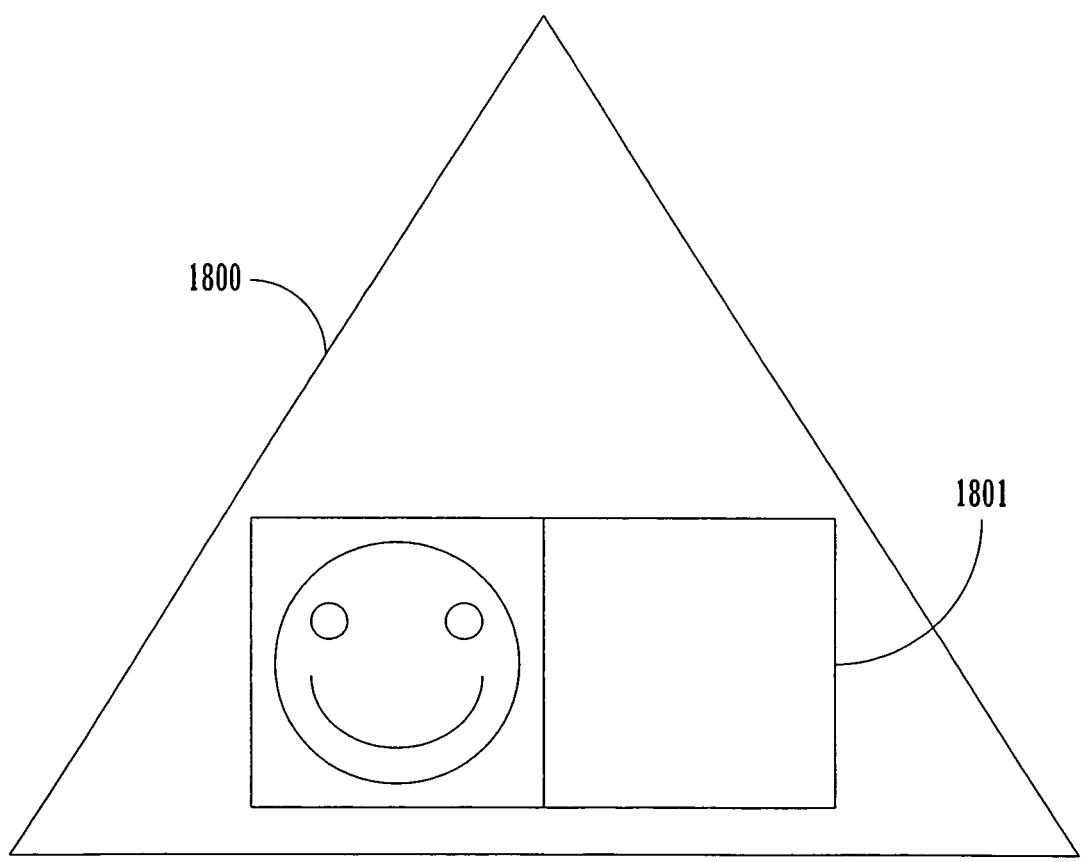
FIG. 18 shows a polygon having a clamped version of the texture applied in accordance with one embodiment of the present invention.

FIG. 18 shows a polygon 1800 having a clamped version of the texture 1600 applied (e.g., as indicated by the arrow 1801). As described above, the clamped version of the texture is merely the same color as the outside edge of the texture 1600 duplicated into the direction the texture coordinates are computed.

Figure 19:
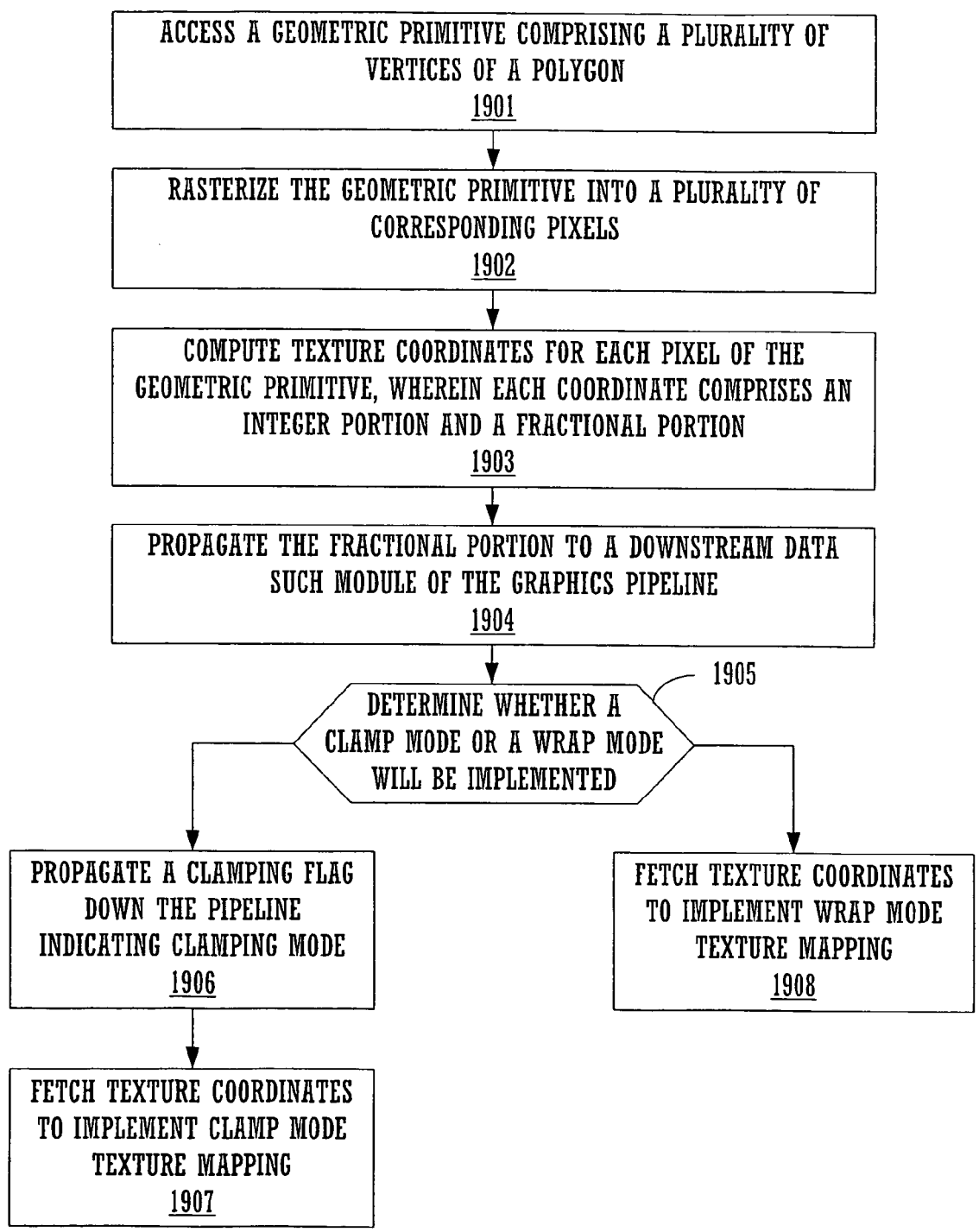
FIG. 19 shows an exemplary flowchart of the steps of a texture coordinate parameter clamping process in accordance with one embodiment of the present invention.

FIG. 19 shows a flowchart of the steps of a texture coordinate parameter clamping process 1900 in accordance with one embodiment of the present invention. As illustrated in FIG. 19, process 1900 shows the steps involved in a computed texture coordinate clamping process as implemented in a raster stage (e.g., raster stage 410) in accordance with one embodiment of the present intention.

Process 1900 begins in step 1901, where the raster stage accesses a geometric primitive comprising its respective vertices of a polygon (e.g., triangle). In step 1902, the geometric primitive is rasterized into a plurality of corresponding pixels. In step 1903, the raster stage 410 processes each pixel of the triangle and computes texture coordinates to be used in subsequent stages of the pipeline. As described above, the computed texture coordinates comprise both an integer portion and a fractional portion. In step 1904, the fractional portion is propagated downstream to the data fetch stage 430.

In step 1905, in accordance with instructions from an application executing on the computer system, a determination is made as to whether a clamp mode or wrap mode will be implemented. In step 1906, in clamp mode, the raster stage 410 computes texture coordinates in accordance with a "clamp" texture mapping mode and propagates a clamping flag down the pipeline. As described above, at the edges of the texture 1600, the texture color is clamped to the value at the edge. In step 1907, texture coordinates are fetched by the data fetch stage 430 to implement clamp mode texture mapping (e.g., as depicted in FIG. 18). In step 1908, in wrap mode, texture coordinates are fetched by the data fetch stage 430 to implement wrap mode texture mapping (e.g., as depicted in FIG. 17).

Figure 20:
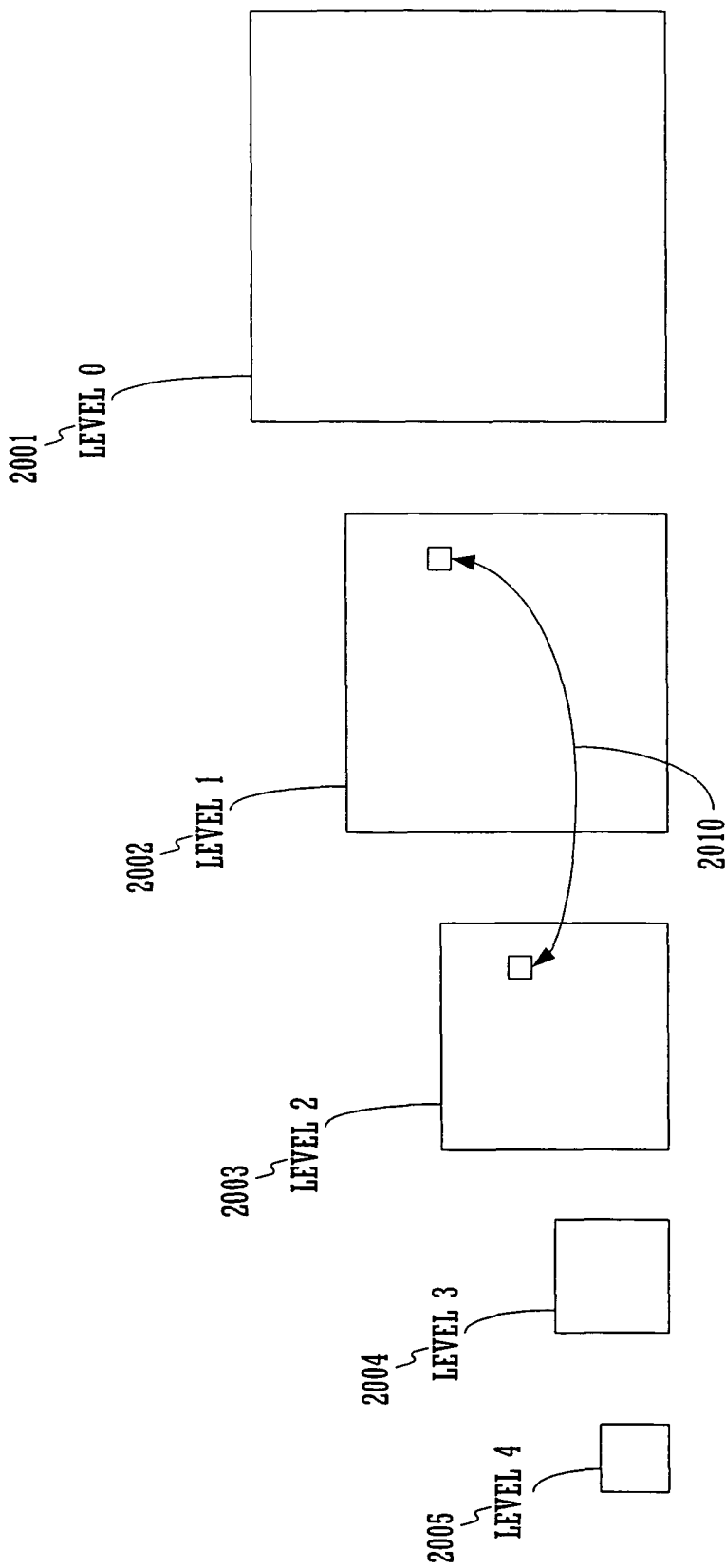
FIG. 20 shows a diagram of an exemplary mip mapping process in accordance with one embodiment of the present invention.

FIG. 20 shows a diagram of an exemplary mip mapping process in accordance with one embodiment of the present invention. As depicted in FIG. 20, five different resolution versions 2001-2005 of a 2-D texture map are shown.

As known by those skilled in the art, mip mapping is a widely used type of LOD filtering. The LOD filtering is configured to prevent moire interference patterns, aliasing, and rendering artifacts by scaling and filtering a full resolution texture map 2001 into multiple lower resolution versions 2002-2005. For example, the full resolution version 2001 contains all the surface details of an object. At close distances to the viewpoint, the full resolution version 2001 renders in its original full detail. As the distances increase, successively smaller resolution versions of the texture (e.g., versions 2002-2005) are used. By choosing the appropriate texture resolution and detail, mip mapping ensures that pixels do not get lost at further distances. Instead, properly averaged smaller versions of the original texture are used. At the furthest distances, a single texel 2005 is used. Each of these stages is known as a mip map level (e.g., level 0 through level 4 shown in FIG. 20). It should be noted that although FIG. 20 shows five levels 2001-2005, embodiments of the present invention can be implemented other numbers of versions (e.g., 3, 7, 10, etc.).

In one embodiment, the raster stage 410 implements LOD parameter clamping, wherein a computed LOD parameter is clamped to a valid range in the raster stage 410 of the graphics pipeline. The clamping functionality in this case comprises accessing a geometric primitive (e.g., triangle) comprising a plurality of vertices wherein each vertex has associated therewith a plurality of parameters including a level of detail (LOD) value. During rasterization of the primitive, a respective LOD value for each pixel of the primitive is computed (e.g., using interpolation). This LOD value is computed using a full precision function. Accordingly, each LOD value of each pixel comprises an integer portion and a fractional portion.

The integer portion of the computed LOD value is used to select the correct mip map level corresponding to the primitive's distance from the viewpoint. The fractional portion of the computed LOD value is used to configure a blending operation performed on adjacent texels of adjacent mip map levels (e.g., where the fractional portion is used to assign different weights to texels of different mip maps). This is shown in FIG. 20 by the arrow 2010 indicating adjacent texels of different mip map levels used in a blending operation in accordance with an LOD fractional portion.

The raster stage 410 is configured to clamp the LOD value to a maximum value if a computed LOD value is greater than the predetermined range (e.g., clamped to the maximum value). Similarly, the raster stage 410 is also configured to clamp the LOD value to a minimum value if a computed LOD value is less than the predetermined range (e.g., clamped to the minimum value). In other words, where the computed LOD parameter indicates a texel:pixel ratio for the primitive which is larger than the coarsest (smallest) mip map level (e.g., version 2005), the LOD value can be clamped to this maximum value (e.g., level 4) and no higher LOD integer values need be computed, stored, or propagated down the pipeline. Where the computed LOD parameter indicates a texel:pixel ratio which is smaller than the finest (largest) mip map level (e.g., level 0), the LOD integer value can be clamped to this minimum value and no lower LOD integer values (e.g., negative LOD integer values) need be computed, stored, or propagated. These clamped LOD parameter values are then propagated down the pipeline to the data fetch stage 430.

In one embodiment, once the maximum or minimum value has been clamped, the fractional portion can also be clamped. For example, in a case where the maximum LOD parameter value has been greatly exceeded (e.g., a parameter indicating a mip map level 10), the lowest resolution version (e.g., level 4) is already being returned, the fractional portion would be insignificant with respect to any blending interpolate. In such a case, the fractional portion can also be clamped to its maximum value. Alternatively, in one embodiment, the fractional portion can merely be discarded (e.g., as having no significant contribution to fragment color).

In one embodiment, a four bit value is used to represent the integer portion of the LOD parameter, and a four bit value is used to present the fractional portion of the LOD parameter.

FIG. 21 shows a flowchart of the steps of an LOD parameter clamping process 2100 in accordance with one embodiment of the present invention. As illustrated in FIG. 21, process 2100 shows the steps involved in a computed LOD value clamping process as implemented in a raster stage (e.g., raster stage 410) in accordance with one embodiment of the present invention.

Process 2100 begins in step 2101, where the raster stage accesses a geometric primitive comprising its respective vertices of a polygon (e.g., triangle). In step 2102, the geometric primitive is rasterized into a plurality of corresponding pixels. In step 2103, the raster stage 410 processes each pixel of the triangle and computes an LOD value to be used in subsequent stages of the pipeline. As described above, the computed LOD value comprises both an integer portion and a fractional portion.

In step 2104, the integer portion and the fractional portion of the LOD parameter are clamped to a valid range. As described above, when the computed LOD parameter exceeds the valid range, the parameter is clamped to its maximum value. When the computed LOD parameter is less than the valid range, the parameter is clamped to its minimum value. In step 2105, the clamped LOD parameter is propagated downstream to the data fetch stage 430 of the pipeline.

In this manner, as with the texture coordinates values, LOD parameters are clamped to a valid range early in the rendering process by the raster stage 410 to save in the number of bits that must be pushed down the pipeline, thereby minimizing power expenditure.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A processor comprising:
a plurality of low fixed precision interpolators for computing a first set of pixel parameters for a geometric primitive;
a plurality of high precision interpolators for computing a second set of pixel parameters for said geometric primitive, wherein said plurality of low fixed precision interpolators operate simultaneously with said plurality of high precision interpolators and wherein said plurality of high precision interpolators operate at a first power consumption level and said plurality of low fixed precision interpolators operates at a second power consumption level, wherein said first power consumption level is greater than said second power consumption level;

a programmable scheduler for scheduling parallel execution of high precision interpolation computations and low fixed precision interpolation computations on said plurality of high precision interpolators and said low fixed precision interpolators, wherein said scheduling is operable to be based on assigning low fixed precision interpolation computations to said low fixed precision interpolators; and an output mechanism coupled to said low fixed precision interpolators and said high precision interpolators for outputting said first set of pixel parameters and said second set of pixel parameters, wherein said low fixed precision interpolators and said high precision interpolators both utilize Barycentric coordinate values for interpolation.

2. The processor as described in claim 1 wherein said Barycentric coordinate values are fixed point values.

3. The processor as described in claim 2 wherein said Barycentric coordinate values are perspective corrected.

4. The processor as described in claim 3 wherein a perspective correction pixel parameter is computed in floating point precision for each pixel of said geometric primitive.

5. The processor as described in claim 1 wherein said first set of pixel parameters are assignable via a software scheduler.

6. The processor as described in claim 1 wherein said second set of pixel parameters are assignable via a software scheduler.

7. The processor as described in claim 1 wherein said plurality of high precision interpolators produce a plurality of results, said results comprising at least 14 bits.

8. The processor as described in claim 1 wherein said plurality of low fixed precision interpolators produce a plurality of results, said results comprising fewer than 14 bits. pixel parameters into a pixel packet for outputting.

9. The processor as described in claim 1 further comprising:

a logic module for arranging the first set of pixel parameters and the second set of pixel parameters into a pixel packet for outputting.

10. A method for implementing multiple interpolators in a raster stage of a graphics processor, comprising:

accessing a geometric primitive; and rasterizing the primitive by:

executing a plurality of high precision interpolation computations to produce a first set of pixel parameters;

executing a plurality of low fixed precision interpolation computations to produce a second set of pixel parameters, wherein said plurality of high precision interpolation computations operate at a first power consumption level and said plurality of low fixed precision interpolation computations operates at a second power consumption level, wherein said first power consumption level is greater than said second power consumption level;

scheduling the high precision interpolation computations and the low fixed precision interpolation computations for parallel execution on an array of interpolators by using a software scheduler, wherein said scheduling is programmable and operable to be based on assigning low fixed precision interpolation computations to said low fixed precision interpolators; and propagating the first set of pixel parameters and the second set of pixel parameters a next stage of the graphics processor wherein said low fixed precision interpolation and said high precision interpolation both utilize Barycentric coordinate values.

11. The method of claim 7, wherein the array of interpolators comprises at least four programmable low fixed precision interpolators and at least four programmable high precision interpolators.

12. The method of claim 7, further comprising:

using a programmable packing logic module to arrange the first set of pixel parameters and the second set of pixel parameters into a pixel packet for propagation to the next stage.

13. In a portable handheld device, a computer system having a memory storing computer readable instructions, which when executed by the computer system, cause the computer system to implement multiple high precision and low fixed precision interpolators in a raster stage of a graphics pipeline, comprising:

accessing a geometric primitive; and rasterizing the primitive by:

executing a plurality of high precision interpolation computations to produce a first set of pixel parameters;

executing a plurality of low fixed precision interpolation computations to produce a second set of pixel parameters, wherein said low fixed precision interpolation and said high precision interpolation both utilize Barycentric coordinate values and wherein said plurality of high precision interpolation computations operate at a first power consumption level and said plurality of low fixed precision interpolation computations operate at a second power consumption level, wherein said first power consumption level is greater than said second power consumption level;

scheduling the high precision interpolation computations and the low fixed precision interpolation computations for parallel execution on an array of interpolators by using a software scheduler, wherein said scheduling is programmable and operable to be based on assigning low fixed precision interpolation computations to said low fixed precision interpolators; and outputting the first set of pixel parameters and the second set of pixel parameters from the raster stage.

14. The portable handheld device of claim 10, wherein the array of interpolators comprises at least four low fixed precision interpolators and at least four high precision interpolators.

15. The portable handheld device of claim 10, further comprising:

using a packing logic module to arrange the first set of pixel parameters and the second set of pixel parameters into a pixel packet for the outputting from the raster stage.

16. The processor as described in claim 1 wherein said programmable scheduler is operable to be programmed in accordance with a raster instruction.

* * * * *